US010436587B2

(12) United States Patent
Sorenson et al.

(10) Patent No.: US 10,436,587 B2
(45) Date of Patent: Oct. 8, 2019

(54) MULTI-MODE CORIOLIS VIBRATORY GYROSCOPES HAVING HIGH ORDER ROTATIONALLY SYMMETRIC MECHANICAL STRUCTURE AND 32 ELECTRODES

(71) Applicant: HRL Laboratories, LLC, Malibu, CA (US)

(72) Inventors: Logan D. Sorenson, Thousand Oaks, CA (US); Hung Nguyen, Los Angeles, CA (US); Raviv Perahia, Calabasas, CA (US); Lian X. Huang, Los Angeles, CA (US); David T. Chang, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/004,310

(22) Filed: Jun. 8, 2018

(65) Prior Publication Data
US 2019/0049246 A1 Feb. 14, 2019

Related U.S. Application Data

(60) Provisional application No. 62/544,661, filed on Aug. 11, 2017.

(51) Int. Cl.
*G01C 19/5684* (2012.01)
*G01C 19/02* (2006.01)
*G01C 19/5712* (2012.01)

(52) U.S. Cl.
CPC ....... *G01C 19/5684* (2013.01); *G01C 19/025* (2013.01); *G01C 19/5712* (2013.01)

(58) Field of Classification Search
None
See application file for complete search history.

(56) References Cited

U.S. PATENT DOCUMENTS

| 7,168,318 | B2 | 1/2007 | Challoner | |
|---|---|---|---|---|
| 2006/0266116 | A1* | 11/2006 | Chikovani | G01C 19/5691 73/504.02 |
| 2009/0064781 | A1* | 3/2009 | Ayazi | G01C 19/5719 73/504.12 |
| 2009/0301193 | A1 | 12/2009 | Schwartz | |

(Continued)

FOREIGN PATENT DOCUMENTS

EP 2696169 A2 2/2014

OTHER PUBLICATIONS

U.S. Appl. No. 14/836,462, Sorenson, filed Aug. 26, 2015.

(Continued)

*Primary Examiner* — Andre J Allen
(74) *Attorney, Agent, or Firm* — Ladas & Parry

(57) ABSTRACT

An angular sensor, comprising a Coriolis vibratory gyroscope (CVG) resonator, capable of oscillating along a first pair of normal n=1 modes comprising a first normal mode and a second normal mode; and a second pair of normal n=2 modes comprising a third normal mode and a fourth normal mode; the sensor further comprising one drive electrode and one sense electrode aligned along an anti-nodal axis of each mode; and a pair of bias tune electrodes aligned with an anti-nodal axis of each mode if no drive and sense electrode pair is aligned with said anti-nodal axis.

30 Claims, 12 Drawing Sheets

(56) References Cited

U.S. PATENT DOCUMENTS

| | | | |
|---|---|---|---|
| 2009/0301194 A1 | 12/2009 | Challoner | |
| 2010/0071465 A1 | 3/2010 | Stewart | |
| 2013/0283911 A1 | 10/2013 | Ayazi | |
| 2014/0260611 A1* | 9/2014 | Johari-Galle | G01C 19/5677 |
| | | | 73/504.12 |
| 2018/0266821 A1* | 9/2018 | Zhang | G01C 19/5677 |
| 2018/0266822 A1* | 9/2018 | Giner | G01C 19/574 |
| 2018/0321037 A1* | 11/2018 | Wen | G01C 19/5698 |
| 2018/0340955 A1* | 11/2018 | Kuisma | H01L 41/0946 |
| 2018/0342667 A1* | 11/2018 | Kuisma | H01L 41/1136 |
| 2019/0033075 A1* | 1/2019 | Wu | G01C 19/5762 |

OTHER PUBLICATIONS

U.S. Appl. No. 15/253,694, Sorenson, filed Aug. 31, 2016.
U.S. Appl. No. 15/253,704, Sorenson, filed Aug. 31, 2016.
U.S. Appl. No. 16/003,010, Huang, filed Jun. 7, 2018.
U.S. Appl. No. 16/102,565, Huang, filed Aug. 13, 2018.
PCT International Written Opinion with Search Report dated Sep. 28, 2018 from PCT/US2018/036786.

* cited by examiner

MULTI-MODE CORIOLIS VIBRATORY GYROSCOPES HAVING HIGH ORDER ROTATIONALLY SYMMETRIC MECHANICAL STRUCTURE AND 32 ELECTRODES

RELATED APPLICATIONS

This Application claims priority to U.S. provisional patent application No. 62/544,661, filed on Aug. 11, 2017 and entitled "Multi-mode Coriolis Vibratory Gyroscopes having High Order Rotationally Symmetric Mechanical Structure and 32 Electrodes"; which is hereby incorporated by reference in its entirety.

TECHNICAL FIELD

This presentation relates to MEMS gyroscopes; in particular using a resonator having a high order mechanical symmetry and preferably having at least 32 electrodes for control and sensing of the resonator oscillations.

BACKGROUND

Gyroscopes may be used in a wide range of applications, including guidance of aircraft, spacecraft, missiles, and the like. A gyroscope (or "gyro") measures an angular rate, i.e., the rate at which the gyroscope is rotated, about one or more axes. The output of a gyroscope may be a digital data stream. The rate resolution of the gyro, i.e., the ability of the gyro to detect low angular rates or small changes in angular rate, may be limited in part by the resolution (i.e., the number of bits) and scale factor of an analog to digital converter (ADC) that may be part of a signal chain connecting a physical sensing element to a digital output of the gyro. The range of the gyro, i.e., the maximum angular rate that it is capable of measuring, may also be related to the resolution and the scale factor of the ADC. As such, a gyro designed to operate at high angular rates may have relatively poor resolution, and a high-resolution gyro may have relatively limited range. Some applications, however, may require a gyro having both high range, e.g., in aircraft or missiles designed to be highly maneuverable, and fine resolution, to provide accurate guidance.

MEMS gyroscopes can be vibrating structure gyroscopes, or "Coriolis vibratory gyroscopes", which use a vibrating structure to determine their rate of rotation following the underlying physical principle that a vibrating object tends to continue vibrating in the same plane even if its support rotates. The Coriolis effect causes the vibrating object to for example exert a force on its support, and by measuring this force the rate of rotation can be determined. Vibrating structure gyroscopes are simpler and cheaper than conventional rotating gyroscopes of similar accuracy. Inexpensive vibrating structure gyroscopes manufactured with MEMS technology are widely used in smartphones, gaming devices, cameras and many other applications.

Known MEMS gyroscopes, such as disclosed in U.S. Pat. No. 7,168,318 (ISOLATED PLANAR MESOGYROSCOPE, to Challoner et al.) remain sensitive to their environment (temperature, vibration).

Environmentally-robust, high-performance inertial sensors with attractive CSWaP (Cost Size Weight and Power) are in strong demand in weapon, space and vehicle systems. There exists a need for a MEMS gyroscope that is less sensitive to its environment than known MEMS gyroscopes.

SUMMARY

This presentation relates to a Coriolis Vibratory Gyroscope (CVG) having electrodes arranged to simultaneously maintain and measure oscillations of a CVG resonator along a pair of n=1 normal modes as well as along a pair of n=2 modes. Where appropriate, the CVG comprises electrodes arranged to fine tune the respective frequencies of the CVG resonator oscillations along said modes. Where appropriate, the CVG can comprise electrodes arranged for generating dynamically induced static torques relative to each of said modes.

According to an embodiment, the CVG resonator exhibits an N-fold rotational symmetry, where N is a power of 2 greater than or equal to 8. According to an embodiment of this presentation, the electrodes of the CVG comprise 16 pairs of differential electrodes arranged around a perimeter of the CVG resonator at a predetermined distance of said perimeter; for example a predetermined distance of 100 nm to 30 µm radially; preferably 2 µm to 30 µm radially.

According to an embodiment of this presentation, the CVG comprises a control circuit that maintains a first target phase difference between the oscillations in the first pair of modes and a second target phase difference between the oscillations in the second pair of modes.

According to an embodiment of this presentation, the CVG comprises a control circuit that uses rotation measurements made at a coarse sensitivity using the sensing of the oscillations in the first pair of modes, as a bias for rotation measurements made at a higher sensitivity using the sensing of the oscillations in the second pair of modes.

According to an embodiment of this presentation, the two n=1 modes are ideally or nominally degenerate. According to an embodiment of this presentation, the two n=2 modes are ideally or nominally degenerate.

An embodiment of this presentation comprises an angular sensor, having: a Coriolis vibratory gyroscope (CVG) resonator, capable of oscillating along: a first pair of normal n=1 modes comprising a first normal mode and a second normal mode; each of the first and second normal modes having one anti-nodal axis; and a second pair of normal n=2 modes comprising a third normal mode and a fourth normal mode; each of the third and fourth normal modes having two anti-nodal axis; at least one of a drive electrode and a sense electrode aligned along the anti-nodal axis of each of the first and second normal modes; at least one of a drive electrode and a sense electrode aligned along a first anti-nodal axis of each of the third and fourth normal modes mode; and a pair of bias tune electrodes aligned with a second anti-nodal axis of each of the third and fourth modes if no drive or sense electrode is aligned with said second anti-nodal axis.

According to an embodiment of this presentation, at least one of a drive electrode and a sense electrode aligned along the first and second anti nodal axis are each part of a pair comprising one sense electrode and one drive electrode.

According to an embodiment of this presentation, the angular sensor, further comprises: a first pair of bias quadrature electrodes aligned with an axis 360/(8*n) degrees off the axis of the at least one of a sense and a drive electrodes of each mode if no drive or sense electrode or no bias tune electrode pair is aligned with said 360/(8*n) degrees off axis; and a second pair of bias quadrature electrodes aligned with an axis 360/(8*n) degrees off the axis of the bias tune electrodes of each mode if no drive or sense electrode or no bias tune electrode pair is aligned with said 360/(8*n) degrees off axis.

According to an embodiment of this presentation, the angular sensor further comprises: a coarse readout circuit configured for: driving the first pair of modes, measuring motion of the first pair of modes with a first sensitivity, and deriving from the measured motion of the first pair of modes a coarse measurement of a true angular rate of the CVG resonator; and a fine readout circuit configured for: receiving the coarse measurement, driving the second pair of modes, measuring motion of the second pair of modes with a second sensitivity higher than the first sensitivity; said measuring being offset by said coarse measurement and deriving, from the measured motion of the second pair of modes and the received coarse measurement, a fine measurement of the true angular rate of the CVG resonator.

According to an embodiment of this presentation, the coarse readout circuit comprises, for said driving the first pair of modes: a first frequency reference configured to generate a first reference signal; and a first phase control circuit configured to: measure a first phase difference between a first phase target, and the difference between: a phase of an oscillation of the first normal mode and a phase of the first reference signal; apply a first phase correction signal to the CVG resonator, to reduce the first phase difference; and a second phase control circuit configured to: measure a second phase difference between a second phase target, and the difference between: a phase of an oscillation of the second normal mode and the phase of the first reference signal; and apply a second phase correction signal to the CVG resonator, to reduce the second phase difference.

According to an embodiment of this presentation, the fine readout circuit comprises, for said driving the second pair of modes: a second frequency reference configured to generate a second reference signal; a third phase control circuit configured to: measure a third phase difference between a third phase target, and the difference between: a phase of an oscillation of the third normal mode and a phase of the second reference signal; and apply a third phase correction signal to the CVG resonator, to reduce the third phase difference; and a fourth phase control circuit configured to: measure a fourth phase difference between a fourth phase target, and the difference between: a phase of an oscillation of the fourth normal mode and the phase of the second reference signal; and apply a fourth phase correction signal to the CVG resonator, to reduce the fourth phase difference.

According to an embodiment of this presentation, the fine readout circuit is configured to drive the third normal mode at a first drive frequency and to drive fourth normal mode at a second drive frequency, and the fine readout circuit is configured to derive the fine measurement of the true angular rate of the CVG resonator by adjusting the first drive frequency and the second drive frequency so that the difference between the first drive frequency and the second drive frequency is proportional to the coarse measurement.

According to an embodiment of this presentation, the fine readout circuit is configured to derive the fine measurement of the true angular rate of the CVG resonator by adjusting a natural frequency of the third normal mode and a natural frequency of fourth normal mode so that the difference between the natural frequency of the third normal mode and the natural frequency of the fourth normal mode is proportional to the coarse measurement.

According to an embodiment of this presentation, the fine readout circuit is configured to adjust the natural frequency of the third normal mode by adjusting a bias voltage applied to a tuning electrode coupled to the third normal mode.

According to an embodiment of this presentation, the resonator has a N-fold rotational symmetry, N being a power of 2 and being at least equal to 8.

According to an embodiment of this presentation, each electrode comprises a sub-electrode set having at least a pair of differential sub-electrodes.

According to an embodiment of this presentation, the angular sensor comprises at least 32 sub-electrodes.

According to an embodiment of this presentation, each electrode comprises a sub-electrode set having at least two pairs of interdigitated differential sub-electrodes.

According to an embodiment of this presentation, the two sub-electrodes of each sub-electrodes pair are arranged for receiving or for emitting differential signals 180 degrees out of phase with respect to each other.

According to an embodiment of this presentation, the frequency reference comprises an atomic frequency reference; an ovenized crystal oscillator (OCXO) or a temperature controlled crystal oscillator (TCXO).

According to an embodiment of this presentation, the atomic frequency reference is a rubidium, cesium, or hydrogen or strontium based clock.

According to an embodiment of this presentation, the atomic frequency reference is a chip-scale atomic clock (CSAC).

According to an embodiment of this presentation, the first phase control circuit is configured to apply a first phase correction signal to the CVG resonator by adjusting a natural frequency of the first normal mode.

According to an embodiment of this presentation, the first phase control circuit is configured to adjust the natural frequency of the first normal mode by applying a bias voltage to a first tuning electrode of the CVG resonator.

According to an embodiment of this presentation, the second phase control circuit is configured to adjust a natural frequency of the second normal mode by applying a bias voltage to a second tuning electrode of the CVG resonator.

According to an embodiment of this presentation, the fine readout circuit is configured to generate a measurement of the difference between the true angular rate of the CVG resonator and the coarse measurement with a resolution of 19 bits.

According to an embodiment of this presentation, the coarse readout circuit is configured to generate a measurement of the difference between the true angular rate of the CVG resonator and the coarse measurement with a resolution of 19 bits.

According to an embodiment of this presentation, the fine readout circuit is configured to generate a measurement of the difference between the true angular rate of the CVG resonator and the coarse measurement with a resolution of 19 bits.

According to an embodiment of this presentation, the coarse readout circuit is configured to drive the first pair of modes so that an amplitude of motion of first normal mode is about 10 times an amplitude of motion of the second normal mode.

According to an embodiment of this presentation, the coarse readout circuit is configured to drive the first pair of modes so that a phase of motion of first normal mode is about 90 degrees different from a phase of motion of the second normal mode.

According to an embodiment of this presentation, the fine readout circuit is configured to drive the first pair of modes so that an amplitude of motion of the third normal mode is about 10 times an amplitude of motion of the fourth normal mode.

According to an embodiment of this presentation, the fine readout circuit is configured to drive the first pair of modes so that a phase of motion of the third normal mode is about 90 degrees different from a phase of motion of the fourth normal mode.

According to an embodiment of this presentation, the fine readout circuit is configured to drive the third normal mode at a first drive frequency and to drive the fourth normal mode at a second drive frequency, and the fine readout circuit is configured to derive a measurement of the difference between the true angular rate of the CVG resonator and the coarse measurement by adjusting the first drive frequency and the second drive frequency so that the difference between the first drive frequency and the second drive frequency is proportional to the coarse measurement.

According to an embodiment of this presentation, the fine readout circuit is configured to derive a measurement of the difference between the true angular rate of the CVG resonator and the coarse measurement by adjusting a natural frequency of the third normal mode and a natural frequency of the fourth normal mode so that the difference between the natural frequency of the third normal mode and the natural frequency of the fourth normal mode is proportional to the coarse measurement.

According to an embodiment of this presentation, the fine readout circuit is configured to adjust the natural frequency of the third normal mode by adjusting a bias voltage applied to a tuning electrode coupled to the third normal mode.

These and other features and advantages will become further apparent from the detailed description and accompanying figures that follow. In the figures and description, numerals indicate the various features; like numerals referring to like features throughout both the drawings and the description.

DESCRIPTION

In the following description, numerous specific details are set forth to clearly describe various specific embodiments disclosed herein. One skilled in the art, however, will understand that the presently described invention may be practiced without all of the specific details discussed below. In other instances, well known features have not been described so as not to obscure the invention.

Embodiments of this presentation relate to an angular sensor having a Coriolis Vibratory Gyroscope resonator configured to oscillate along a pair of n=1 modes and a pair of n=2 modes that preferably has a rotational symmetry equal or greater than 8-fold, that is also a power of 2 (i.e., 8, 16, 32, 64, etc.). Rotational symmetry, also known as radial symmetry in biology, is the property a shape has when it looks the same after some rotation by a partial turn. An object's degree of rotational symmetry is the number of distinct orientations in which it looks the same.

Figure 1:
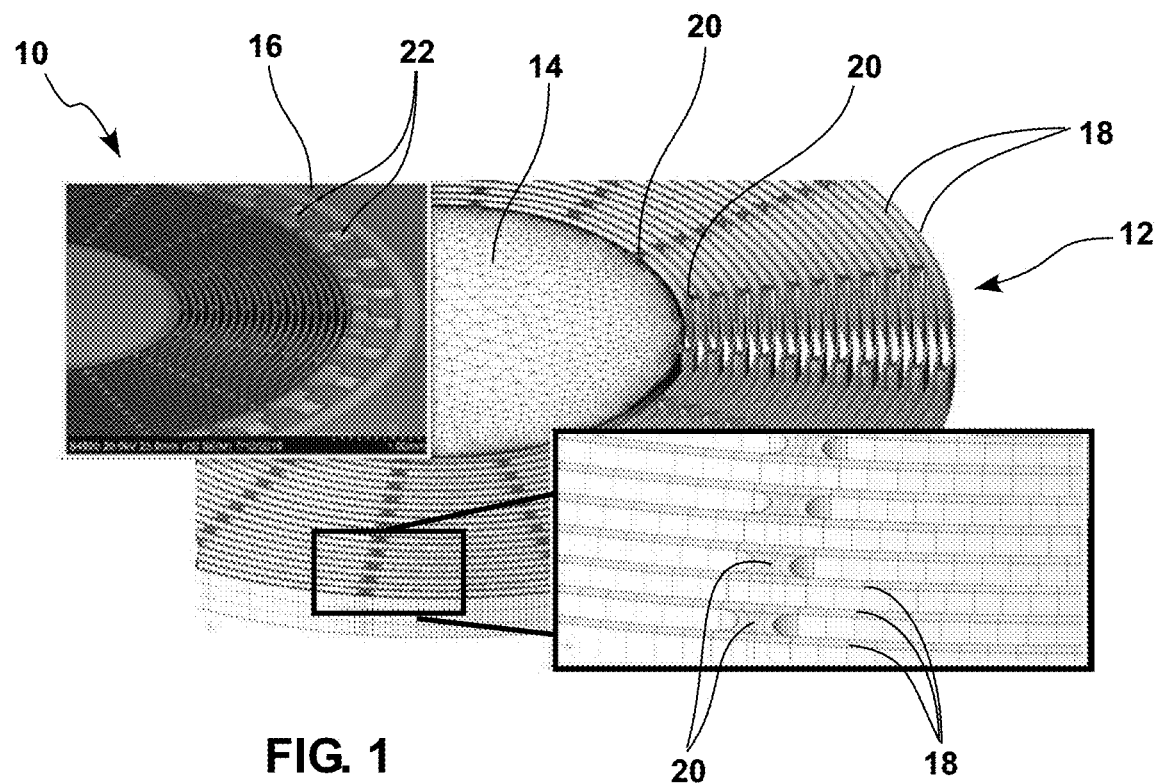
FIG. 1 shows a picture of a fragment of an angular sensor according to an embodiment of this presentation, as well as a fragment of a detailed view of a CVG resonator of the sensor and a very detailed view of a fragment of the CVG resonator.

FIG. 1 shows a picture of a fragment of an angular sensor 10 according to an embodiment of this presentation, comprising a CVG resonator 12 having an 8-fold degree of rotational symmetry, comprising a flat central circular portion 14, the bottom of which (not shown) is attached to a substrate 16 by a support such as a pillar (not shown), as well as a plurality of concentric rings 18 in essentially the same plane as the circular portion 14. An innermost concentric ring 18 is attached to the central portion 14 by a series of posts 20 (e.g. N=8 posts in the illustrated N=8-fold degree of rotational symmetry resonator 12) regularly arranged along the perimeter of central portion 14. Each further concentric ring toward the outside of the resonator is attached to the preceding concentric ring by a series of N posts rotated 360/N degrees around the axis of the resonator with respect to the posts attaching the preceding ring to the center of the resonator. A multiple number of N of posts can also be used instead of N posts. The central portion 14, the concentric rings 18 and the posts 20 can be formed by etching away matter from a single substrate; for example a semiconductor substrate. Other types of resonator architectures than the one illustrated in FIG. 1 can be used. A resonator of the type illustrated in FIG. 1 is for example described in provisional U.S. application No. 62/555,617, which is hereby incorporated by reference. The mechanical resonator 12 can be fabricated using standard microelectromechanical systems (MEMS) processes, especially high aspect ratio deep reactive ion etching (DRIE) of silicon-on-insulator (SOI) wafers and releasing the CVG mechanical resonator structure from the handle substrate via hydrofluoric (HF) acid etching (either liquid HF followed by critical point drying (CPD) or dry vapor HF release which doesn't require the subsequent CPD step). An example of such a structure includes Disk Resonator Gyroscopes (DRGs, FIG. 1) and Flower-of-life Vibratory Gyroscopes described in U.S. Provisional Patent Application 62/542,744, which is incorporated by reference.

According to embodiments of this presentation, a plurality of electrodes 22 are arranged on substrate 16 along the periphery of resonator 12, at a predetermined distance from the periphery of the resonator so as to form an electrostatic gap between the electrodes and the resonator. According to an embodiment of this presentation, electrodes 22 can be separated from the periphery of the CVG mechanical resonator disk by a radial electrostatic gap ranging from 100 nm to 30 µm in width/distance; preferably 2 µm to 30 µm in distance. The electrodes 22 can be created by simultaneously etching a gap into the same (e.g. silicon) layer as the mechanical vibratory structure 12, so that the electrodes are self-aligned around the periphery of resonator 12.

According to embodiments of this presentation and as detailed hereafter, resonator 12 is capable of oscillating along a first pair of normal n=1 modes comprising a first normal mode and a second normal mode; each of the first and second normal modes having one anti-nodal axis; and along a second pair of normal n=2 modes comprising a third normal mode and a fourth normal mode; each of the third and fourth normal modes having two anti-nodal axis. As detailed hereafter, electrodes 22 comprise: at least one of a drive electrode and a sense electrode aligned along the anti-nodal axis of each of the first and second normal modes; at least one of a drive electrode and a sense electrode aligned along a first anti-nodal axis of each of the third and fourth normal modes mode; and a pair of bias tune electrodes aligned with a second anti-nodal axis of each of the third and fourth modes if no drive or sense electrode is aligned with said second anti-nodal axis. Indeed, as detailed hereafter, in some resonators the anti-nodal axis of a first of the four modes can be aligned with the anti-nodal axis of a second one of the four modes. In such occurrence, a sensor according to the present disclosure comprises in priority drive and sense electrodes aligned with an anti-nodal axis of each of the first and second one of the four modes, over having a pair of bias tune electrodes aligned with an anti-nodal axis of one of said first and second modes. It is only when an anti-nodal axis of one of the first and second modes is free of drive and sense electrodes that it can comprise a pair of bias tune electrodes.

According to embodiments of this presentation and as also detailed hereafter, electrodes 22 further comprise, for each mode: a first pair of bias quadrature electrodes aligned with an axis 360/(8*n) degrees clockwise off the anti-nodal axis of each mode, if no drive and sense electrode pair or no bias tune electrode pair is aligned with said 360/(8*n) degrees off axis; and a second pair of bias quadrature electrodes aligned with an axis 360/(8*n) degrees anti-clockwise off the anti-nodal axis of each mode, if no drive and sense electrode pair or no bias tune electrode pair is aligned with said 360/(8*n) degrees off axis.

According to embodiments of this presentation and as detailed hereafter, each of the electrodes outlined above (drive electrode, sense electrode, bias tune electrode, bias quadrature electrode) can be a differential electrode comprising at least two electrodes arranged side by side. According to embodiments of this presentation, the sensor can be sealed with a lid in a vacuum environment to maintain high quality factor (Q).

Figure 2:
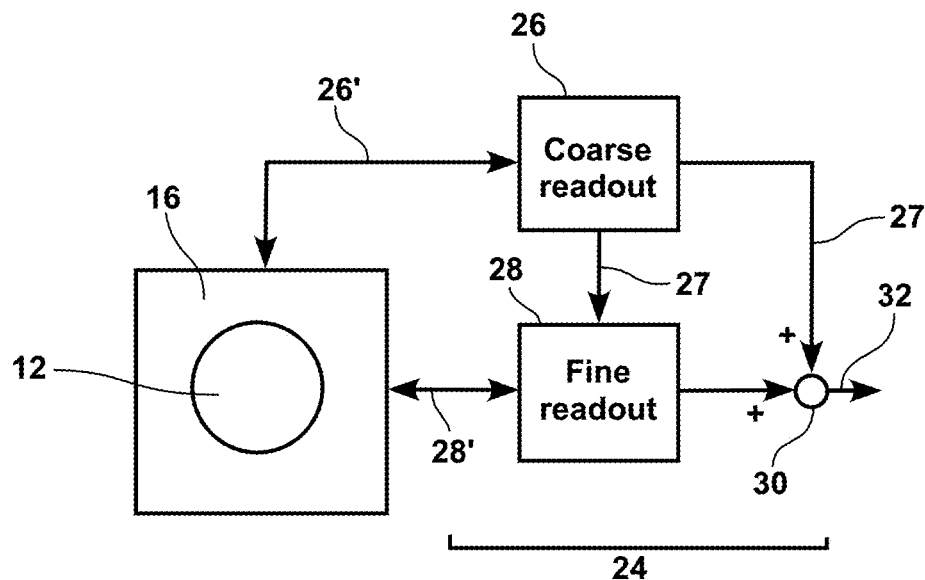
FIG. 2 shows a schematic of sensing circuit that can be used in an angular sensor according to an embodiment of this presentation.

FIG. 2 illustrates schematically elements of a sensing circuit 24 of an angular sensor 10 according to an embodiment of this presentation, the sensing circuit 24 comprising a coarse readout circuit 26, a fine readout circuit 28 and a summing circuit 30 generating a high dynamic range signal at an output 32. Sensing circuit 24 can be made, and can operate, as detailed for example in U.S. patent application Ser. No. 15/253,694, which is hereby incorporated by reference. In embodiments of this presentation, coarse readout circuit 26 and fine readout circuit 28 are coupled 26', 28' to the resonator electrodes to drive (with the drive electrodes) the first and second pairs of modes; measure (with the sense electrodes) motion of the first and second pairs of modes, and derive coarse and fine measurements of the rotation of the vibrating resonator 12 around its axis, as detailed hereafter.

According to embodiments of this presentation, coarse readout circuit 26 can be configured for: driving the first pair of (n=1) modes, measuring motion of the first pair of modes with a first sensitivity, and deriving from the measured motion of the first pair of modes a coarse measurement 27 of a true angular rate of the CVG resonator 12. According to embodiments of this presentation, fine readout circuit 28 can be configured for: receiving the coarse measurement 27, driving the second pair of (n=2) modes, measuring motion of the second pair of modes with a second sensitivity higher than the first sensitivity; said measuring being offset by said coarse measurement 27 and deriving, from the measured motion of the second pair of modes and the received coarse measurement 27, a fine measurement 32 of the true angular rate of the CVG resonator.

Figure 3:
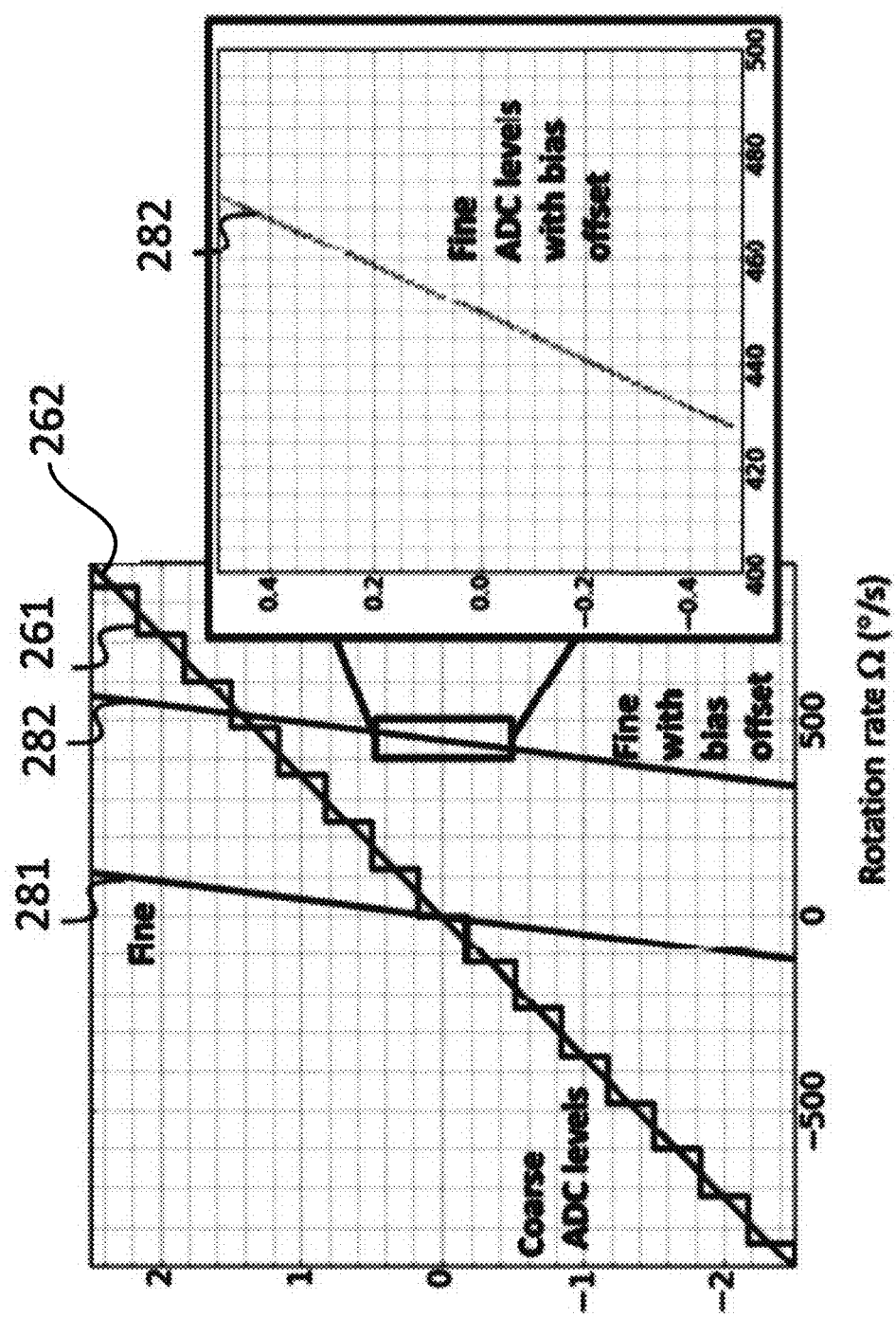
FIG. 3 illustrates the operation of a sensing circuit such as illustrated in FIG. 2.

FIG. 3 illustrates the operation of sensing circuit 24 according to an embodiment of this presentation: coarse readout circuit 26 receives an analog angular rotation rate signal 262 (the rate at which resonator 12 rotates around its axis) and outputs a digital angular rotation rate signal 261 with a relatively small scale factor. Curve 261 shows a digital output of the coarse readout circuit 26 as a function of the analog rotation rate 262 of resonator 12. For example, the coarse readout circuit 26 may generate a 19-bit data stream, each 19-bit number in the data stream output by coarse readout circuit 26 representing the instantaneous angular rate of the CVG 10, with a proportionality factor or "scale factor" equal to $2^{18}$ (the 19th bit being a sign bit) divided by the maximum measurable rate. For example, $2^{18}$ being 262,144, for a CVG 10 capable of measuring a maximum angular rate of ±900 degrees per second, the scale factor may be 262,144/900 or about 291.3 bits per degrees per second and the rate resolution is 900/262,144 or about 0.0034 degrees per second. In some embodiments the coarse readout circuit can include 24-bit analog-to-digital and digital-to-analog converters (not shown), which may have inherent noise, so that the effective number of bits may be 19 or 20 bits. FIG. 3 illustrates a lower resolution, 4-bit ADC for clarity, where 16 ADC output levels corresponding to the possible 4-bit numbers are discernible on digital curve 261.

According to an embodiment of this presentation, the output of the coarse readout circuit 26 is fed 27 to the fine readout circuit 28 as an offset or bias adjustment, such that the output range of the fine readout circuit 28 can be significantly smaller, and a larger scale factor may be used. For example, if the difference between the angular rate 262 and the digital representation of the angular rate at the output of the coarse readout circuit 26 is one-half bit of the coarse readout circuit output (i.e., one half of 0.0034 degrees per second), then a residual angular rate measured by the fine readout circuit 28 may be ±0.003412 degrees per second, i.e., ±0.0017 degrees per second. Accordingly, the scale factor of the fine readout circuit 28 may be selected to be significantly greater than the scale factor of the coarse readout circuit 26. For example, if the fine readout circuit 28 also generates a 19-bit data stream, each 19-bit number in the data stream representing a residual instantaneous angular rate of the CVG (i.e. after subtraction of the coarse readout circuit offset), then the resolution of the fine readout circuit 28 may be 0.0017 degrees per second divided by $2^{18}$ (the 19th bit being a sign bit), i.e., $6.5 \times 10^{-9}$ degrees per second, or 24 microdegrees per hour. In FIG. 3, curve 281 shows the output of the fine readout circuit 28 without offset subtraction, and curve 282 shows the output of the fine readout circuit 28 with offset subtraction.

According to an embodiment of this presentation, fine readout circuit 28 can be configured to drive the second pair of (n=2) modes so that a phase of motion of the third normal mode is about 90 degrees different from a phase of motion of the fourth normal mode.

According to an embodiment of this presentation, fine readout circuit 28 can be configured to drive the third normal mode at a first drive frequency and to drive the fourth normal mode at a second drive frequency; and to derive a measurement of the difference between the true angular rate of the CVG resonator 12 and the coarse measurement 27 by adjusting the first drive frequency and the second drive frequency so that the difference between the first drive frequency and the second drive frequency is proportional to the coarse measurement 27.

According to an embodiment of this presentation. The drive frequency and phase of a mode can be determined by the signals sent to the drive electrode of the mode.

Figure 4A:
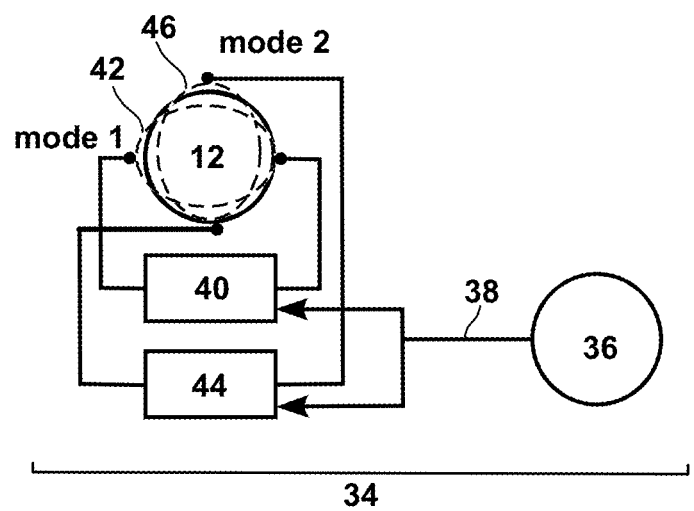
FIGS. 4A and B show schematics of mode phase control circuits that can be used in an angular sensor according to an embodiment of this presentation.

According to an embodiment of this presentation, fine readout circuit 28 can be configured to derive a measurement of the difference between the true angular rate of the CVG resonator 12 and the coarse measurement 27 by adjusting a natural frequency of the third normal mode and a natural frequency of the fourth normal mode so that the difference between the natural frequency of the third normal mode and the natural frequency of the fourth normal mode is proportional to the coarse measurement. According to an embodiment of this presentation, a first pair (e.g. BT1) of bias tune electrodes can be used to adjust the third normal mode frequency; and a second pair (e.g. BT2) of bias tune electrodes can be used to adjust the fourth normal mode frequency FIG. 4A shows a schematic of a drive circuit 34 of coarse readout circuit 26 according to embodiments of this presentation, comprising a first frequency reference 36 configured to generate a first reference signal 38; a first phase control circuit 40 configured to: measure a first phase difference between a first phase target, and the difference between a phase of an oscillation of the first normal mode 42 and a phase of the first reference signal 38; and to apply a first phase correction signal to the CVG resonator 12, to reduce the first phase difference. According to an embodiment of this disclosure, coarse readout circuit 26 further comprises a second phase control circuit 44 configured to measure a second phase difference between a second phase target, and the difference between a phase of an oscillation of the second normal mode 46 and the phase of the first reference signal 38; and to apply a second phase correction signal to the CVG resonator 12, to reduce the second phase difference. According to embodiments of this presentation, the control loops formed by control circuits 40 and 44 can cause the first (n=1) mode 42 and the second (n=1) mode 46 to oscillate at a same frequency with a phase difference of 90 degree. This for example allows easily detecting an energy transfer from the first mode into the second mode during a rotation of resonator 12. Detailed diagrams illustrating the first and second normal modes can be found in FIGS. 9A and 9B.

According to an embodiment of this presentation, the first phase control circuit 40 can be configured to apply a first phase correction signal to the CVG resonator 12 by adjusting a natural frequency of the first normal mode. According to an embodiment of this presentation, electrodes 22 do not comprise a dedicated DC tuning electrode for the first normal mode and a DC tuning voltage of the first normal mode is applied in addition to the AC voltage and/or current on the drive (e.g. N1D1{+/−}) and the sense (e.g. N1S1{+/−}) electrodes of the first normal mode to adjust the first normal mode frequency.

According to an embodiment of this presentation, the first phase control circuit 40 can be configured to adjust the natural frequency of the first normal mode by applying a bias voltage to a first tuning electrode of the CVG resonator 12. According to an embodiment of this presentation, the natural frequency of the first normal mode can be adjusted by adding a DC tuning voltage to the AC signals on the drive (e.g. N1D1{+/−}) and the sense (e.g. N1S1{+/−}) electrodes of the first normal mode.

According to an embodiment of this presentation, the first phase control circuit 40 can be configured to adjust a natural frequency of the second normal mode by applying a bias voltage to a second tuning electrode of the CVG resonator. According to an embodiment of this presentation, the frequency of the second normal mode can be adjusted by adding a DC tuning voltage to the AC signals on the drive (e.g. N1D2{+/−}) and the sense (e.g. N1S2{+/−}) electrodes of the second mode.

Figure 4B:
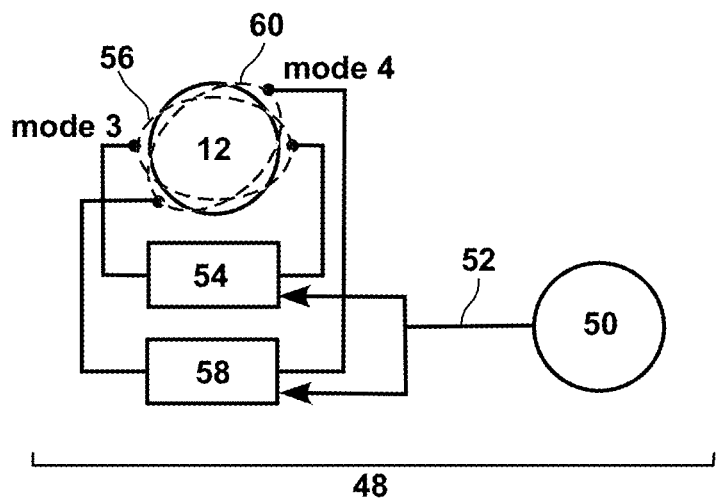

FIG. 4B shows a schematic of a drive circuit 48 of fine readout circuit 28 according to embodiments of this presentation, comprising a second frequency reference 50 configured to generate a second reference signal 52; a third phase control circuit 54 configured to: measure a third phase difference between a third phase target, and the difference between a phase of an oscillation of the third normal mode 56 and a phase of the second reference signal 52; and to apply a third phase correction signal to the CVG resonator 12, to reduce the third phase difference. According to an embodiment of this disclosure, fine readout circuit 48 further comprises a fourth phase control circuit 58 configured to measure a fourth phase difference between a fourth phase target, and the difference between a phase of an oscillation of the fourth normal mode 60 and the phase of the second reference signal 52; and to apply a fourth phase correction signal to the CVG resonator 12, to reduce the second phase difference. According to embodiments of this presentation, the control loops formed by control circuits 54 and 58 can cause the third (n=2) mode 56 and the fourth (n=2) mode 60 to oscillate at a same frequency with a phase difference of 90 degree. This for example allows easily detecting an energy transfer from the third mode into the fourth mode during a rotation of resonator 12. Detailed diagrams illustrating the third and fourth normal modes can be found in FIGS. 9C and 9D.

For ease of reference, drive circuits 34 and 48 are shown in two separate FIGS. 4A and 4B, but the electrodes and components forming drive circuits 34 and 48 are preferably all arranged on substrate 16, as well as the remainder of sensing circuit 24. Drive circuits 34 and 48 can be made, and can operate, as detailed for example in U.S. patent application Ser. No. 15/253,694 or in U.S. patent application Ser. No. 15/253,704, which are both hereby incorporated by reference.

Figure 5:
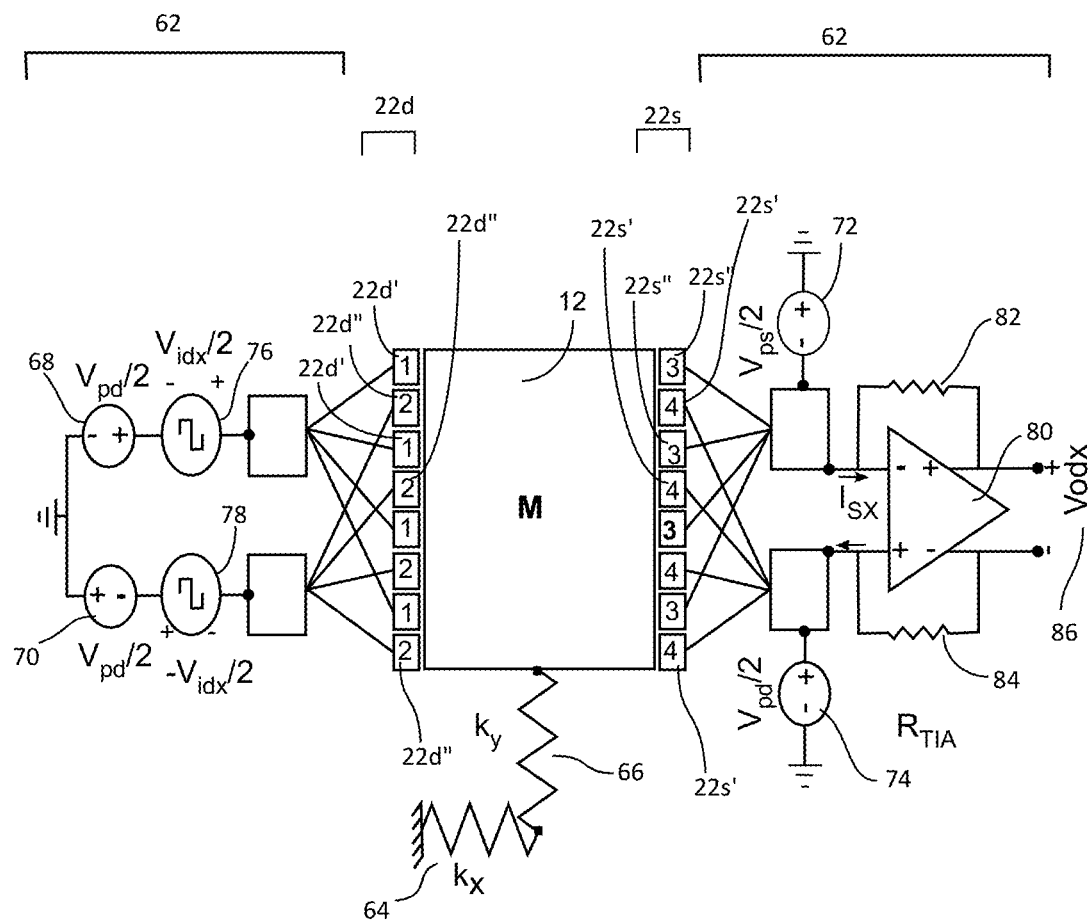
FIG. 5 shows a schematic of a differential electrode control circuit that can be used in an angular sensor according to an embodiment of this presentation.

FIG. 5 illustrates differential electrodes 22d, 22s and a differential electrode drive and sense circuit 62 that can be part of an angular sensor according to an embodiment of this presentation. In particular, the drive and sense differential electrodes and the drive and sense circuit can be part of each of control circuits 40, 44, 54 and 58, the drive and sense electrodes being aligned with the mode associated with the control circuit. In FIG. 5, resonator 12 is illustrated as a rectangle mass M suspended by a pair of effective mechanical springs Kx 64 and Ky 66. For ease of calculation, Ky 66 may be assumed in some cases to be infinite such that the vibrational motion of the mass 12 occurs only in a single degree-of-freedom (DOF) along the horizontal or X direction. According to embodiments of this presentation, mass 12 is assumed to be electrically conductive and at an electric ground potential of 0 volts. In FIG. 5, the X axis is aligned with one of the four normal modes of resonator 12. For ease of illustration, the other modes of resonator 12 or the circular shape of resonator 12 are not shown. According to an embodiment of this presentation, resonator 12 is circular and comprises at least four normal modes of oscillation (two n=1 modes; two n=2 modes). In FIG. 5, a single drive electrode 22d is shown on one side of resonator 12 and a corresponding single sense electrode 22s is shown in the other side of resonator 12, aligned with electrode 22d along the X axis/normal mode of the resonator.

According to embodiments of this presentation, drive electrode 22d and sense electrode 22s comprise each a sub-electrode set having at least one pair of differential sub-electrodes (respectively 22d', 22d" and 22s', 22s") arranged side by side. According to embodiments of this presentation, electrodes 22d, 22s comprise each more than one pair of differential sub-electrodes arranged side by side in an interdigitated manner.

According to an embodiment of this presentation, a first half 22d' of the sub-electrode set of drive electrode 22d can be maintained at a DC voltage 68 of +Vpd/2, and the second half 22d" of the sub-electrode set of drive electrode 22d can be maintained at a DC voltage 70 of −Vpd/2 so that a total potential difference between drive sub-electrodes 22d' and drive sub-electrode 22d" is Vpd.

According to an embodiment of this presentation, a first half 22s' of the sub-electrode set of sense electrode 22s can be maintained at a DC voltage 72 of +Vps/2, and the second half 22s" of the sub-electrode set of sense electrode 22s can be maintained at a DC voltage 74 of −Vps/2 so that a total potential difference between sense sub-electrodes 22s' and sense sub-electrode 22s" is Vps.

According to an embodiment of this presentation, the input driving voltage is split into out of phase halves, for example such that an AC voltage 76 of value Vid/2 applied to drive sub-electrodes 22d' is positive while an AC voltage 78 of value −Vid/2 applied to drive sub-electrodes 22d" is negative. This combination of out of phase electrical voltages is termed differential drive. According to an embodiment of this presentation, on the sense side, the motional currents from sense sub-electrodes 22s', 22s", respectively, are out of phase for a uniform motion of mass 12. This is an example of differential sense. The sense sub-electrodes 22s" are connected to a negative input of a differential Trans Impedance Amplifier (TIA) 80 and the sense sub-electrodes 22s' are connected to a positive input of differential TIA 80. According to an embodiment of this presentation, differential TIA 80 has a feedback resistor (R_TIA) 82 coupled to the negative input of TIA 80 and a feedback resistor (R_TIA) 84 coupled to the positive input of TIA 80. The TIA 80 amplifies the differential motional currents $I_{SX}$ from 22s" and 22s' and converts them to a differential output voltage Vodx 86. A person skilled in the art will understand that the device can also operate if the first sense sub-electrodes 22s" have a DC voltage of +Vps/2, and the second sense sub-electrodes 22s' have a DC voltage of −Vps/2. The total potential difference between the sense sub-electrodes 22s" and sense sub-electrodes 22s' is still Vps.

Because the drive electrodes 22d', 22d" are driven by AC voltages Vid/2 (76) and −Vid/2 (78), which are 180 degrees out of phase, and because the parasitic capacitances, between drive sub-electrodes 22'd and sense sub-electrodes 22s'" and between drive sub-electrodes 22d" and sense sub-electrodes 22s'", are arranged to be approximately equal, the feedthrough currents generated by the parasitic capacitances are out of phase and cancel each other out at sense sub-electrodes 22s'". Similarly, the out of phase feedthrough currents generated by the parasitic capacitances cancel each other out at sense sub-electrodes 22s'.

The differential electrodes 22d, 22s and differential electrode drive and sense circuit 62 illustrated in FIG. 5 can for example be made, and can operate, as detailed in U.S. patent application Ser. No. 14/836,462, which is hereby incorporated by reference.

Figure 6:
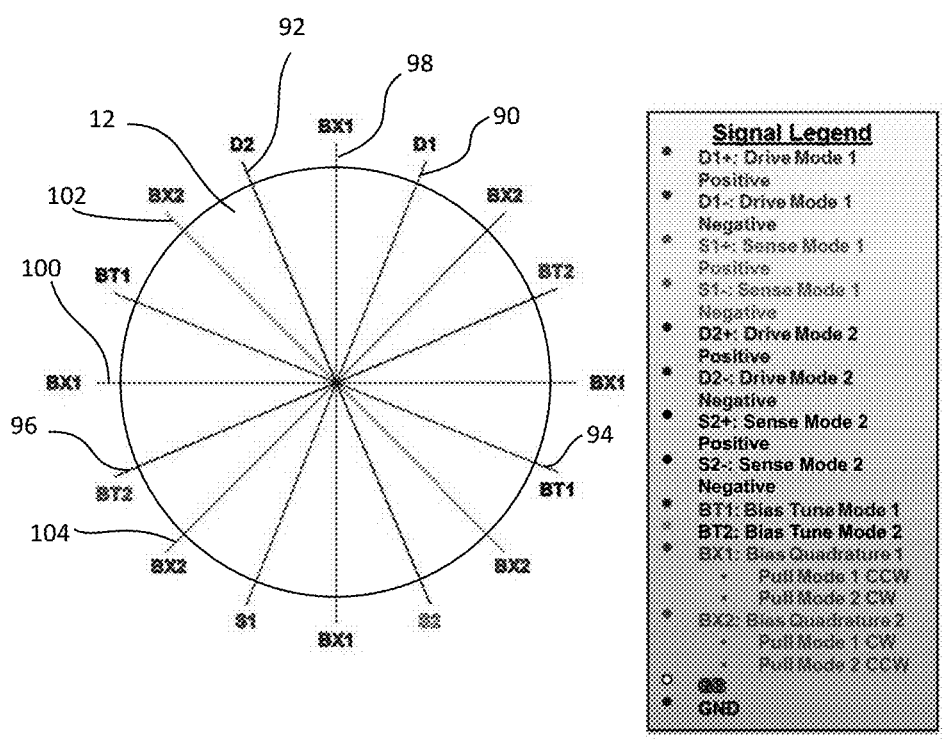
FIG. 6 illustrates the anti-nodal axis of the CVG resonator of an angular sensor according to an embodiment of this presentation.

FIG. 6 illustrates a portion of the node and anti-nodal axes of a CVG resonator 12 of an angular sensor according to an embodiment of this presentation. FIG. 6 only illustrates the anti-nodal axes of two n=2 modes; their corresponding anti-nodal axes; as well as the axes for bias quadrature electrodes that can be associated with said modes.

A first n=2 mode of resonator 12 has an anti-nodal axis 90, shown making an angle of π/8 clockwise with respect to the vertical of FIG. 6. According to an embodiment of this presentation a drive electrode 22d (not shown) such as illustrated in FIG. 5 is arranged on one side of the periphery of resonator 12 at the position marked D1, in alignment with axis 90; and a sense electrode 22s (not shown) such as illustrated in FIG. 5 is arranged on the opposite side of the periphery of resonator 12 at the position marked S1, in alignment with axis 90.

A second n=2 mode of resonator 12 has an anti-nodal axis 92, shown making an angle of π/8 anticlockwise with respect to the vertical of FIG. 6. According to an embodiment of this presentation a drive electrode 22d (not shown) is arranged on one side of the periphery of resonator 12 at the position marked D2, in alignment with axis 92; and a sense electrode 22s (not shown) is arranged on the opposite side of the periphery of resonator 12 at the position marked S2, in alignment with axis 92.

A second anti-nodal axis 94 of the first n=2 mode is illustrated in FIG. 6, making an angle of π/2 with respect to the anti-nodal axis 90 of the first n=2 mode. According to an embodiment of this disclosure, a bias tune electrode (not shown) is arranged on each side of the periphery of resonator 12 along axis 94 (at the positions marked BT1) because no anti-nodal axis of another mode of resonator 12 having sense/drive electrodes is aligned with axis 94. According to an embodiment of this presentation, the bias tune electrodes can have the same structure as the sense and drive electrodes illustrated in FIG. 5. According to an embodiment of this presentation, a DC voltage can be maintained between the bias tune electrodes arranged along the anti-nodal axis of a mode to fine-tune the oscillation frequency of said mode (by making the electromechanical system of the resonator more or less rigid along said mode: applying an electrostatic tuning potential to the bias tune electrodes creates a negative electrostatic stiffness, resulting in a softer mode vibrational stiffness and effectively lowering the frequency of the mode). Such frequency tuning by adjusting a bias voltage can be implemented for example as detailed in U.S. patent application Ser. No. 15/253,694 or in U.S. patent application Ser. No. 15/253,704, which are both hereby incorporated by reference. According to an embodiment of this presentation, a DC voltage can be additionally sent to the drive electrodes of the sensor to add a linear component to the drive signal sent to the resonator; Similarly, a DC voltage can be additionally sent to the sense electrodes of the sensor to add a gain factor to the sense signal received on these electrodes.

Similarly, a second anti-nodal axis 96 of the second n=2 mode is illustrated in FIG. 6, making an angle of $\pi/2$ with respect to the anti-nodal axis 92 of the second n=2 mode. According to an embodiment of this disclosure if no sense and drive electrodes are aligned with axis 96, a bias tune electrode (not shown) is arranged on each side of the periphery of resonator 12 along axis 96, at the positions marked BT2. The bias tune electrodes at BT2 can have the same structure and the same function/operation with respect to the second mode as the bias tune electrodes at BT1 with respect to the first mode.

According to embodiments of this presentation, a first bias quadrature axis 98 associated with the first n=2 mode is illustrated, making an angle of $\pi/8$ anticlockwise with respect to first anti-nodal axis 90; and a second bias quadrature axis 100 associated with the first n=2 mode is illustrated, making an angle of $\pi/8$ anticlockwise with respect to first anti-nodal axis 94. According to embodiments of this presentation, if no sense or drive electrodes or bias tune electrode pair of a mode of resonator 12 are aligned with axis 98, a bias quadrature electrode (not shown) is arranged on each side of the periphery of resonator 12 along axis 98, at the positions marked BX1. Similarly, if no sense or drive electrodes or bias tune electrode pair of a mode of resonator 12 are aligned with axis 100, a bias quadrature electrode (not shown) is arranged on each side of the periphery of resonator 12 along axis 100, at the positions also marked BX1. The bias quadrature electrodes at BX1 can have the same structure as the sense and drive electrodes illustrated in FIG. 5. Dynamic control of DC voltages applied where appropriate to the bias quadrature electrodes at BX1 introduces a dynamically induced static torque that allows compensating for fabrication imperfections of the resonator 12. Having four electrodes at the four positions marked BX1 is preferred. However, if the bias quadrature axis are aligned with axis having sense and drive electrodes or bias tune electrodes of other modes, only two electrodes can be used to implement a partial bias quadrature control. Details about how to operate the BX1 electrodes and BX2 electrodes are provided hereafter in relation with FIG. 7.

According to embodiments of this presentation, a third bias quadrature axis 102 associated with the second n=2 mode is illustrated, making an angle of $\pi/8$ anticlockwise with respect to second anti-nodal axis 92; and a fourth bias quadrature axis 104 also associated with the second n=2 mode is illustrated, making an angle of $\pi/8$ anticlockwise with respect to first anti-nodal axis 96. According to embodiments of this presentation, if no sense or drive electrodes or bias tune electrode pair of a mode of resonator 12 are aligned with axis 102, a bias quadrature electrode (not shown) is arranged on each side of the periphery of resonator 12 along axis 102, at the positions marked BX2. Similarly, if no sense or drive electrodes or bias tune electrode pair of a mode of resonator 12 are aligned with axis 104, a bias quadrature electrode (not shown) is arranged on each side of the periphery of resonator 12 along axis 104, at the positions also marked BX2. The bias quadrature electrodes at BX2 can have the same structure as the sense and drive electrodes illustrated in FIG. 5. Operation of the bias quadrature electrodes at BX2 can be the same as the operation of the bias quadrature electrodes at BX1.

Figure 7:
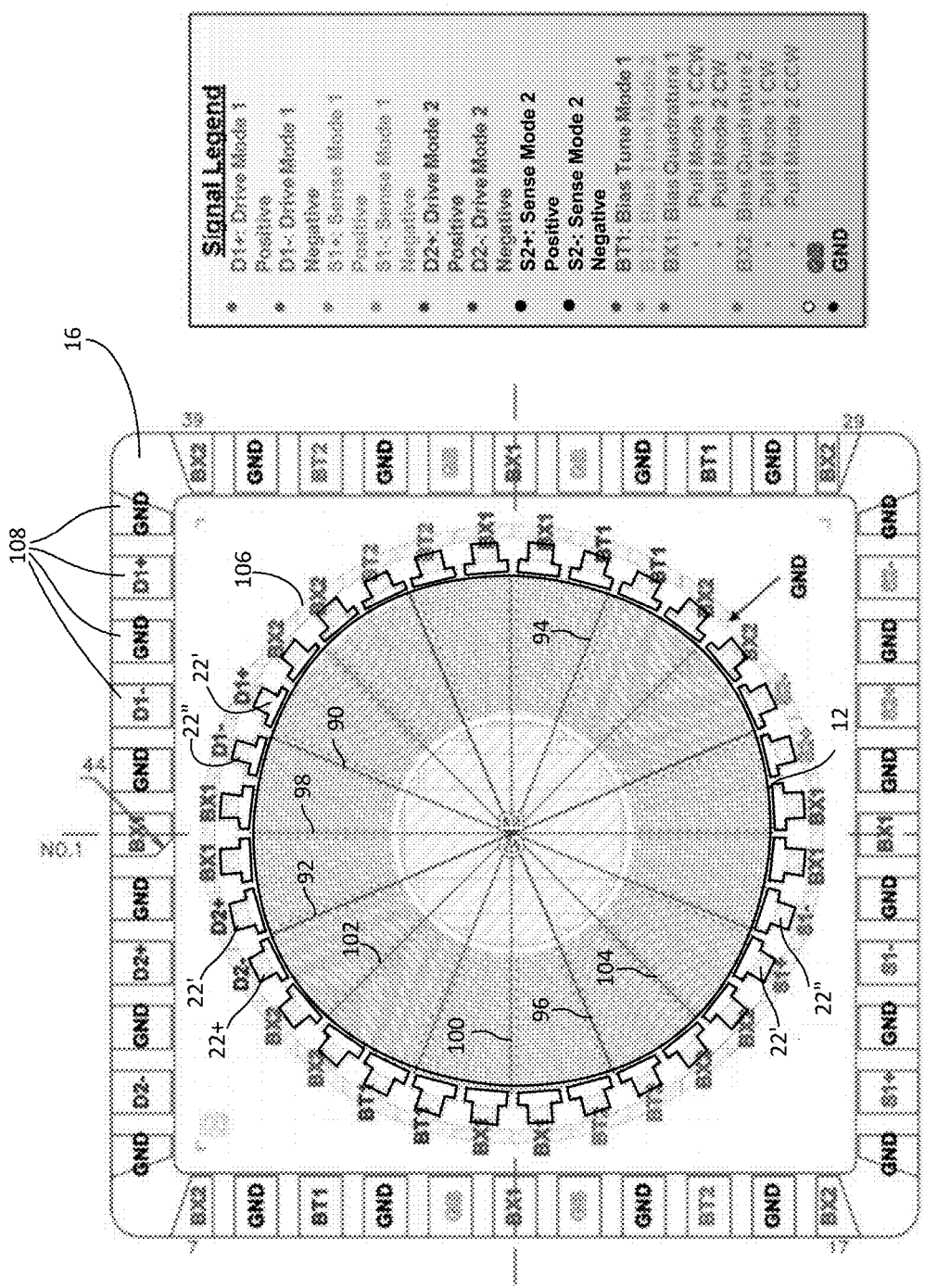
FIG. 7 illustrates ideal positions of the control and sense electrodes of a CVG resonator of an angular sensor according to an embodiment of this presentation.

FIG. 7 illustrates the positions of electrodes corresponding to the two n=2 modes illustrated in FIG. 6, in an embodiment where each electrode comprises only two sub-electrodes. For example, the drive electrode at position D1 can comprise two drive sub-electrodes 22', 22" respectively at positions D1+, D1− arranged symmetrically with respect to axis 90 on the periphery of resonator 12. Similarly, the sense electrode at position S1 can comprise two sense sub-electrodes 22', 22" respectively at positions S1+, S1− arranged symmetrically with respect to axis 90 on the periphery of resonator 12, opposite position D1. According to an embodiment of this presentation, the differential drive and sense electrodes at positions D1+, D1−; S1+, S1− can be connected to a first drive and sense circuit 62 such as illustrated in FIG. 5.

Similarly to the above, the drive electrode 22 at position D2 can comprise two sense sub-electrodes 22', 22" respectively at positions D2+, D2− arranged symmetrically with respect to axis 92 on the periphery of resonator 12, and the sense electrode 22 at position S2 can comprise two sense sub-electrodes 22', 22" respectively at positions S2+, S2− arranged symmetrically with respect to axis 92 on the periphery of resonator 12, opposite position D2. According to an embodiment of this presentation, the differential drive and sense electrodes at positions D2+, D2−; S2+, S2− can be connected to a second drive and sense circuit 62 such as illustrated in FIG. 5.

As illustrated in FIG. 7, the electrodes 22 at positions BT1, BT2, BX1 and BX2 can each comprise two sub-electrodes 22', 22" arranged symmetrically with respect to axis 94, 96, 98, 100, 102, 104 on each side of the periphery of resonator 12. According to an embodiment of this presentation, the two sub-electrodes at each of positions BT1, BT2, BX1 and BX2 can be connected together, thus forming each a non-differential electrode. According to an embodiment of this presentation, a ring electrode 106 can be arranged around the electrodes 22 of the sensor. According to an embodiment of this presentation, contact pads 108 can be arranged on the surface of substrate 16, for example close to the edges of substrate 16 as illustrated in FIG. 7 so as to form a LCC44-type package. According to an embodiment, substrate 16 can comprise at least one contact pad 108 corresponding to, and electrically connected with, each electrode 22 or sub-electrode 22', 22" of the sensor. According to an embodiment of this presentation, each contact pad provided for receiving a signal can be separated from a neighboring contact pad provided for receiving another signal by a contact pad provided for being connected to a ground, coupled to the ring electrode 106 or also for example to the resonator 12 (GB pad).

It is noted that the combination of the electrodes 22, mechanical resonator 12 and electrostatic gap between the electrodes 22 and resonator 12 as illustrated in FIG. 7 forms an electrostatic transducer, which may serve two purposes:

1/ applying an AC voltage signal at or near the resonance frequency of the n=2 vibratory modes on either the D1 or D2 electrodes will excite mechanical vibratory motion of the CVG mechanical resonator disk in either the first n=2 mode or the second n=2 mode, respectively; and 2/ vibratory motion along the first n=2 mode or the second n=2 mode of the CVG mechanical resonator 12 will generate an AC sense current which can be amplified and converted by a transimpedance amplifier (TIA) to a voltage signal for conversion to digital domain through an analog-to-digital converter (ADC).

In both cases, a DC voltage must be applied across the electrostatic gap to polarize it, so that either the driving function or the sensing function of the particular electrostatic transducer can be performed. To cancel electrostatic feedthrough as for example disclosed in U.S. application Ser. No. 14/836,462 (hereby incorporated by reference), the drive and sense electrodes are split into positive (+) and negative (−) sub-electrodes, respectively. A differential AC voltage signal (equal amplitude, but opposite phase/polarity) is applied to the sub-electrodes in positions D1+ and D1−, respectively. This excites vibratory motion of the CVG mechanical resonator 12 in the first of the n=2 modes. The vibratory motion can then be detected by applying a DC polarization voltage across the S1+ and S1− electrostatic transduction gaps. This in turn creates a pair of differential sense currents which are amplified and converted to a differential voltage signal by a differential TIA. The same method is applied to D2+/− and S2+/−.

According to an embodiment of this presentation, when the disk or ring gyroscope or resonator 12 deforms its perimeter into an elliptical shape, for example along the first n=2 mode, there are two anti-nodal points which have a greater radial distance from the center (e.g. on FIG. 7, axis 90), and two anti-nodal points which have a lesser radial distance from the center (e.g. FIG. 7, axis 94). This is a snapshot of the vibration pattern at the peak of a first half of the sinusoidal cycle in time. In this configuration, the BX1 electrodes, if there is a substantial potential difference between them and electrodes GB, exert a counter clockwise (CCW) directed force on the two anti-nodal points on axis 90, which acts to pull the vibration mode pattern toward the BX1 electrodes. At the anti-nodal points on axis 94, since the vibration pattern causes the effective gap to be larger (the disk is moving toward the center at these points), these points will experience a smaller force. Hence, the net result is a torque on the first n=2 mode vibration pattern in the counter clockwise direction. In the next half cycle, the anti-nodal points on axis 94 go farther away from the center, and the anti-nodal points on axis 90 come closer to the center. In this case, now the force is developed on axis 94, but it is still directed in the counter clockwise direction (CCW), so the net effect in the second half cycle is also to pull the first n=2 mode toward the BX1 electrode axes.

In a similar manner, the BX2 electrodes can pull the first n=2 mode clockwise (CW) toward the BX2 electrodes.

According to an embodiment of this presentation, the opposite is true for the effects of BX1 and BX2 on the second n=2 mode (i.e., BX1 pulls the second n=2 mode clockwise/CW and BX2 pulls the second n=2 mode counter clockwise/CCW). However, in case a first n=2 mode is driven at a constant amplitude (e.g. using a phase-locked loop or PLL and an automatic gain control (AGC) circuit on the drive mode) and the second n=2 mode is undriven (open loop) or actively driven to a zero motion motion (force-to-rebalance operation), the second mode amplitude will be very small and not greatly affected by the BX electrodes. In such a case, by aligning the drive mode properly using a combination of tuning voltages applied to BX1 and/or BX2, the sense mode motion in response to applied rotation will automatically be aligned since the Coriolis effect produces a force that is the cross product of the radially directed velocity and the vertically (out-of-plane) directed rotation axis. For the n=2 modes, the direction of such a force is 45° from the drive axis, which is the sense mode. In other words, if the first n=2 mode is driven with the D1 electrodes on axis 90, and BX1 and BX2 are adjusted appropriately to align the second n=2 mode exactly to axis 90, then the resulting net driving force due to Coriolis effect under rotation is directed along the n=2 Mode 2 (sense mode) axis which is axis 92 in FIG. 7. According to an embodiment of this presentation, electrodes GB can be biased to a non-zero DC value and the BX1/BX2 electrodes can be nominally kept at DC ground (until a tuning potential is applied to them) or the GB electrodes can be held to ground potential and then BX1/BX2 can be DC biased.

Figure 8:
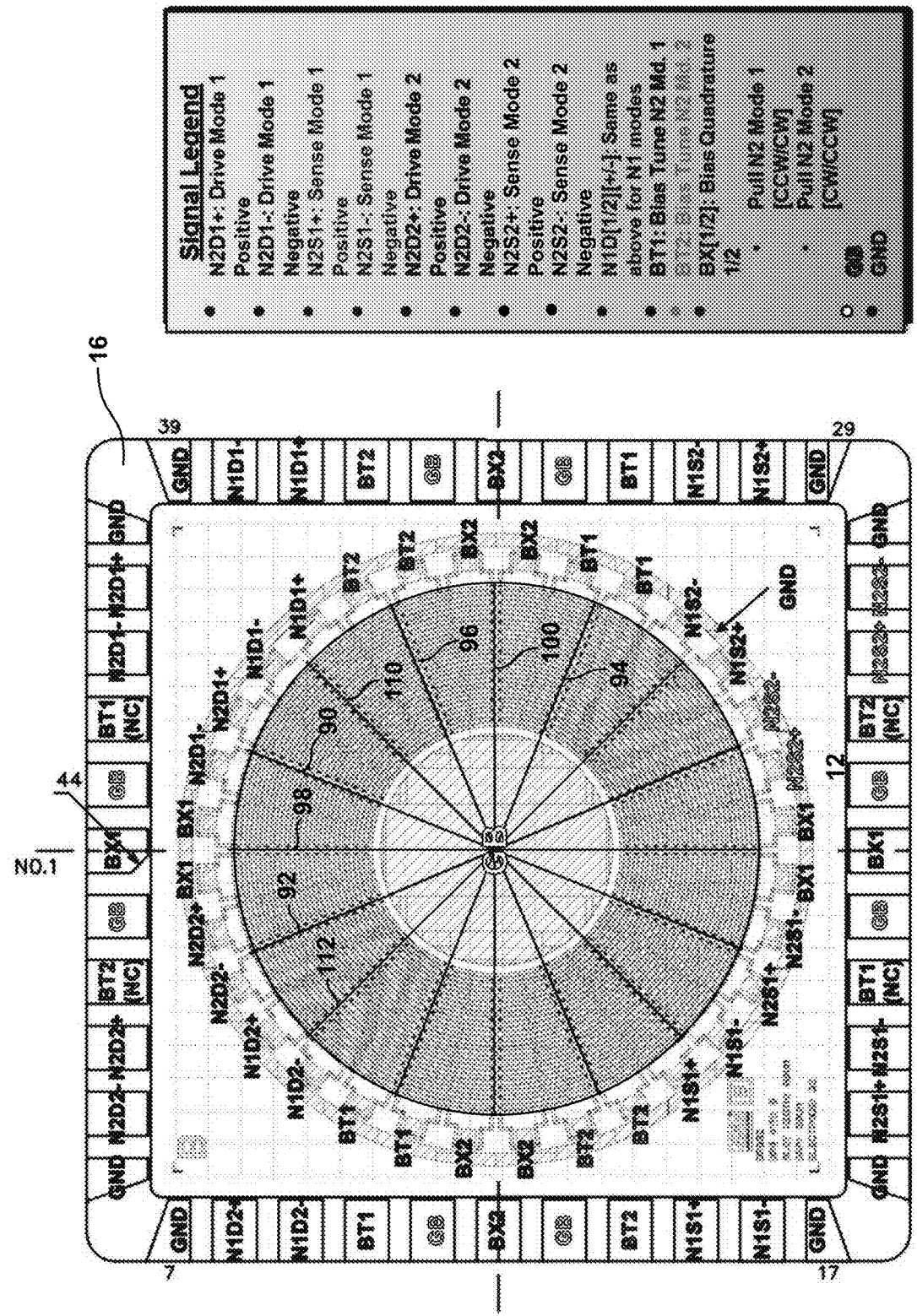
FIG. 8 illustrates practical positions of the control and sense electrodes of a CVG resonator of an angular sensor according to an embodiment of this presentation.

FIG. 8 illustrates practical positions of the control and sense electrodes of a CVG resonator 12 of an angular sensor according to an embodiment of this presentation. As outlined above, a resonator 12 according to an embodiment of this presentation comprises a pair of n=1 modes and a pair of n=2 modes. The resonator 12 of FIG. 8 is capable of oscillating along a first n=1 normal mode having an antinodal axis 110 angled π/4 clockwise with respect to the vertical in FIG. 8, and along a second n=1 normal mode having an anti-nodal axis 112 angled π/4 anticlockwise with respect to the vertical. According to an embodiment of this presentation, resonator 12 is also capable of oscillating along a third, n=2, normal mode having an anti-nodal axis 90 as described in relation with FIGS. 6 and 7; and along a fourth, n=2, normal mode having an anti-nodal axis 92 as described in relation with FIGS. 6 and 7. It appears immediately that for axis 110 and 112 are respectfully aligned with axis 104 and 102 as illustrated in FIG. 6.

According to embodiments of this presentation, a drive electrode for the first normal mode can comprise two drive sub-electrodes 22', 22" respectively at positions marked N1D1+, N1D1−, arranged symmetrically with respect to axis 110 on the periphery of resonator 12. Similarly, a sense electrode for the first normal mode can comprise two sense sub-electrodes 22', 22" respectively at positions marked N1S1+, N1S1−, arranged symmetrically with respect to axis 110 on the periphery of resonator 12, opposite positions N1D1+, N1D1−. According to an embodiment of this presentation, the differential drive and sense electrodes at positions N1D1+, N1D1−; N1S1+, N1S1− can be connected to a third drive and sense circuit 62 such as illustrated in FIG. 5.

According to embodiments of this presentation, a drive electrode for the second normal mode can comprise two drive sub-electrodes 22', 22" respectively at positions marked N1D2+, N1D2−, arranged symmetrically with respect to axis 112 on the periphery of resonator 12. Similarly, a sense electrode for the second normal mode can comprise two sense sub-electrodes 22', 22" respectively at positions marked N1S2+, N1S2−, arranged symmetrically with respect to axis 112 on the periphery of resonator 12, opposite positions N1D2+, N1D2−. According to an embodiment of this presentation, the differential drive and sense electrodes at positions N1D2+, N1D2−; N1S2+, N1S2− can be connected to a fourth drive and sense circuit 62 such as illustrated in FIG. 5.

According to embodiments of this presentation, the sensor of FIG. 8 comprises sense and drive sub-electrodes as disclosed in FIG. 7, at positions N2D1+, N2D1−, N2S1+, N2S1−, N2D2+, N2D2−, N2S2+, N2S2− for driving and sensing oscillations along the normal modes having antinodal axes 90 and 92. According to an embodiment of this presentation, the positions of the drive and sense electrodes for a mode can be exchanged to one side or another of the periphery of the resonator 12.

According to an embodiment of this presentation, and as illustrated in FIG. 8, no bias tune electrodes of the first or second normal modes is present on the periphery of resonator 12. According to an embodiment of this presentation, and as illustrated in FIG. 8, because the directions π/4 off the anti-nodal axes 110 and 112 of the first and second, n=1, normal modes of resonator 12 are not aligned with any drive/sense electrode pairs or any bias tune electrode pair, a first pair of bias quadrature electrodes is arranged on the periphery of resonator 12, at positions BX2 aligned with axis 100, which is 45 degrees off axis 110; and a second pair of bias quadrature electrodes is arranged on the periphery of resonator 12, at positions BX1 aligned with axis 98, which is 45 degrees off axis 112. It is noted that each bias quadrature electrode at positions BX1, BX2 is illustrated in FIG. 8 as comprising two sub-electrodes arranged symmetrically with respect to axis 98, 100. According to embodiments of this presentation and as outlined previously, the two sub-electrodes of each bias quadrature electrode can be connected together to a contact pad on substrate 16; and alternatively each bias quadrature electrode can be a single electrode. It is noted that, because the two n=1 modes of the resonator have axis that are π/2 off, the bias quadrature electrodes at positions BX1, BX2 can be used to compensate for fabrication imperfections of the resonator 12 affecting both the first and second n=1 modes.

According to an embodiment of this presentation, and as illustrated in FIG. 8, because the anti-nodal axis 94 of the third, n=2, normal mode of resonator 12 (along axis 90) comprises no drive/sense electrodes from another mode of resonator 12, a pair of bias tune electrodes of the third normal mode is present at positions BT1 on the periphery of resonator 12, aligned with axis 94. Similarly, because the anti-nodal axis 96 of the fourth, n=2, normal mode of resonator 12 (along axis 92) comprises no drive/sense electrodes from another mode of resonator 12, a pair of bias tune electrodes of the fourth normal mode is present at positions BT2 on the periphery of resonator 12, aligned with axis 96.

According to an embodiment of this presentation, and as illustrated in FIG. 8, because the directions π/8 clockwise off the anti-nodal axes 90 and 94 of the third, n=2, normal mode of resonator 12 are aligned with the drive/sense electrode pairs associated with the first and second modes of resonator 12, no bias quadrature electrodes corresponding to the third and fourth modes are arranged on the periphery of resonator 12 on axes 110 and 112. Similarly, because the directions π/8 counter clockwise off the anti-nodal axes 92 and 96 of the fourth, n=2, normal mode of resonator 12 are aligned with the drive/sense electrode pairs associated with the first and second modes of resonator 12, no bias quadrature electrodes corresponding to the third and fourth modes are arranged on the periphery of resonator 12 on axes 110 and 112. The electrodes labeled BX1 and BX2, indicating their functions for the first and second, n=1, primary modes of the resonator 12, on axes 98 and 100 may be used as quadrature electrodes BX1 for the third and fourth, n=2, primary modes, in the manner previously indicated in FIG. 7. If needed, BX2 functionality may be achieved for the third and fourth, n=2, primary modes by adjusting the DC level on the N1{D/S}{+/−} electrodes appropriately.

According to an embodiment of this presentation, having resonator 12 follow a rotational symmetry that exhibits an N-fold rotational symmetry, where N is a power of 2 greater than or equal to 8, advantageously allows having n=1 and n=2 mode pair patterns that align with spring patterns in the resonator with little frequency split, thus easing the drive of the various modes at desired frequencies with desired phases. According to an embodiment of this presentation, the contact pads coupled to differential sub-electrodes can be arranged side by side on substrate 16, for example as illustrated in FIG. 8.

Having electrodes arranged as shown in FIG. 8 allows operating simultaneously both the n=1 and n=2 pairs of modes of the CVG mechanical resonator 12. This has at least the two following advantages: a/ The rotation measurement (sense) signal obtained from the n=1 modes pair can be used as a coarse rotation signal readout and combined with the rotation measurement signal obtained from the n=2 modes pair to create a higher dynamic range gyroscope system, similarly to what described in U.S. application Ser. No. 15/253,694 for n=2 and n=3 modes pairs; and b/ controlling the n=1 modes pair using force-rebalance techniques that eliminate or mitigate the effect of vibration on the gyro, since these are the in-plane modes most sensitive to acceleration, similarly to what described in U.S. application Ser. No. 15/253,704 for n=2 and n=3 modes pairs.

Figure 9A:
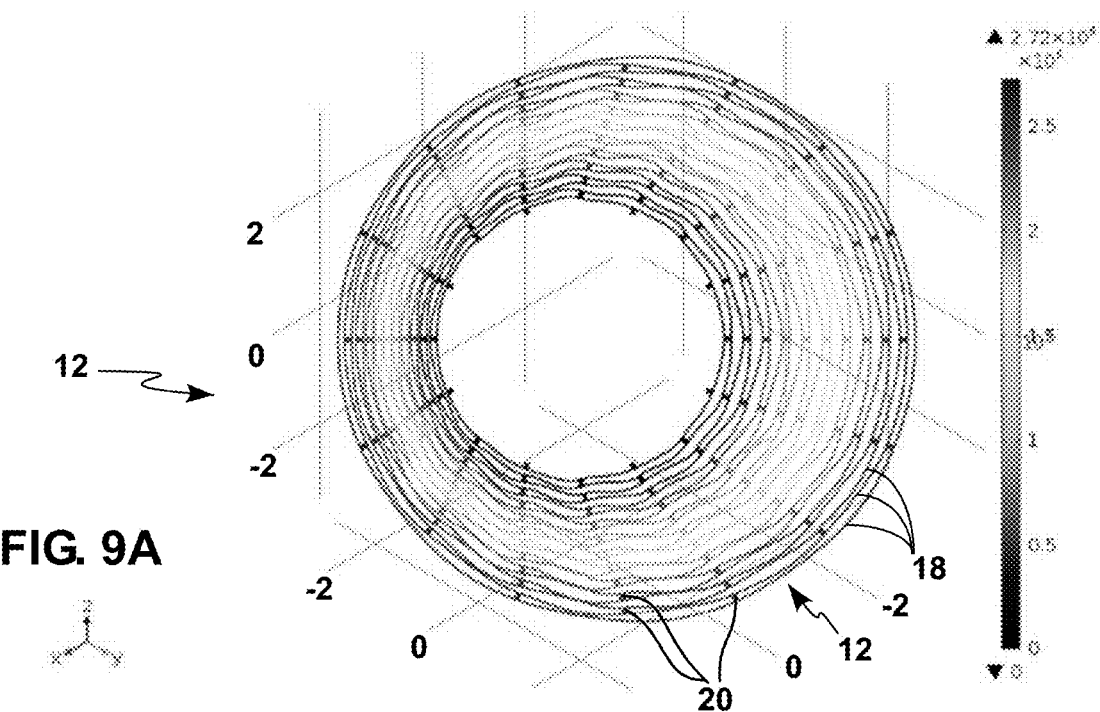
FIG. 9A illustrates a first n=1 mode of oscillation of a CVG resonator of an angular sensor according to an embodiment of this presentation.

FIG. 9A illustrates a maximum deformation of a resonator 12 as shown in FIG. 1 (a plane resonator comprising successive concentric rings 18 attached to a central circular portion (not shown), then to each other, by posts 20) when the resonator oscillates in a first, n=1, mode of oscillation of the resonator; the mode having an horizontal axis in the figure.

Figure 9B:
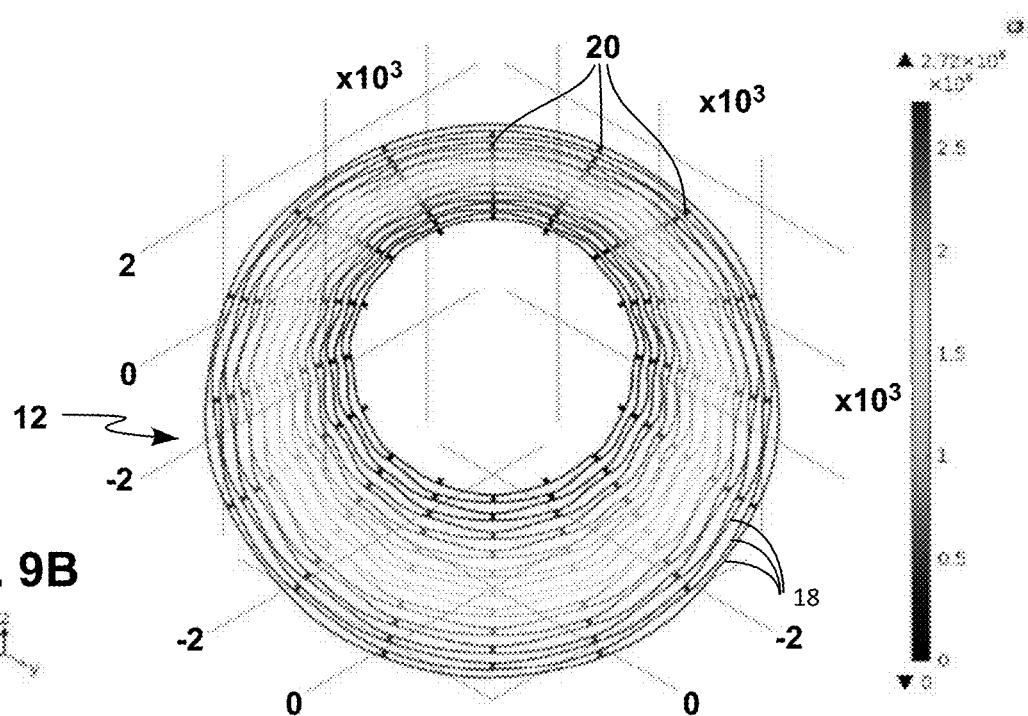
FIG. 9B illustrates a second n=1 mode of oscillation of a CVG resonator of an angular sensor according to an embodiment of this presentation.

FIG. 9B illustrates a maximum deformation of a resonator 12 as shown in FIG. 1 when the resonator oscillates in a second, n=1, mode of oscillation of the resonator; the mode having a vertical axis in the figure.

Figure 9C:
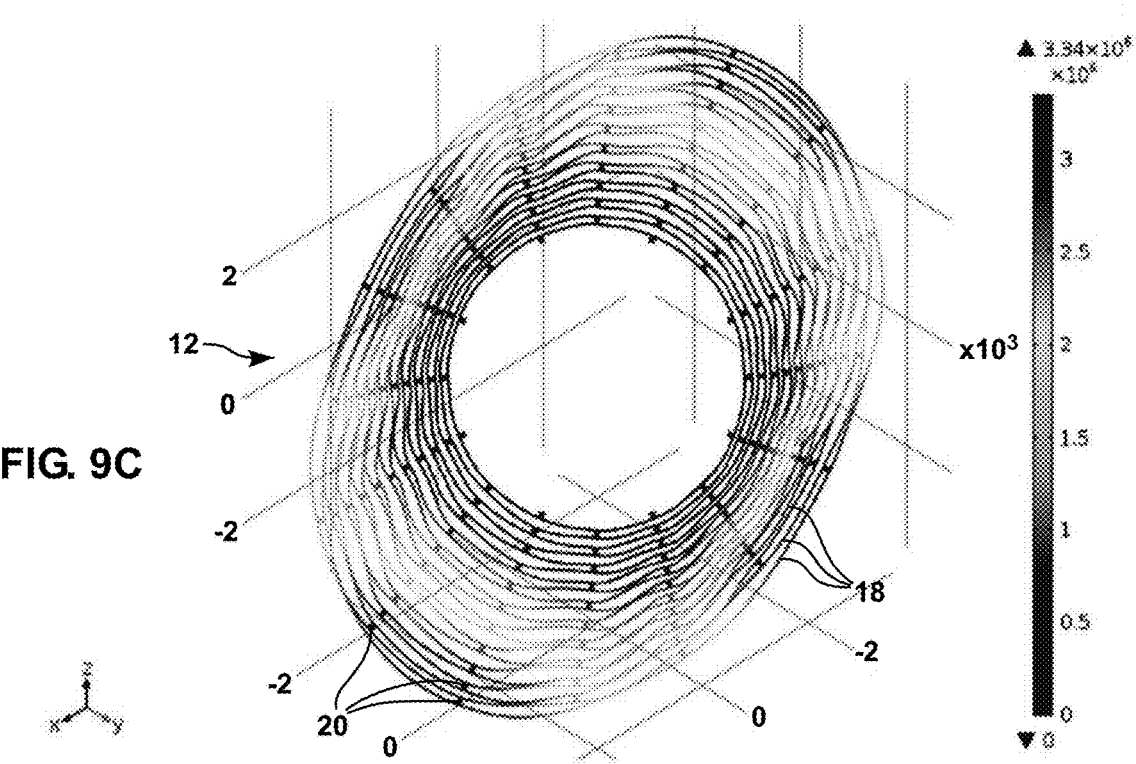
FIG. 9C illustrates a first n=2 mode of oscillation of a CVG resonator of an angular sensor according to an embodiment of this presentation.

FIG. 9C illustrates a maximum deformation of a resonator 12 as shown in FIG. 1 when the resonator oscillates in a third, n=2, mode of oscillation of the resonator; the mode having an axis π/8 off clockwise with respect to the vertical in the figure.

Figure 9D:
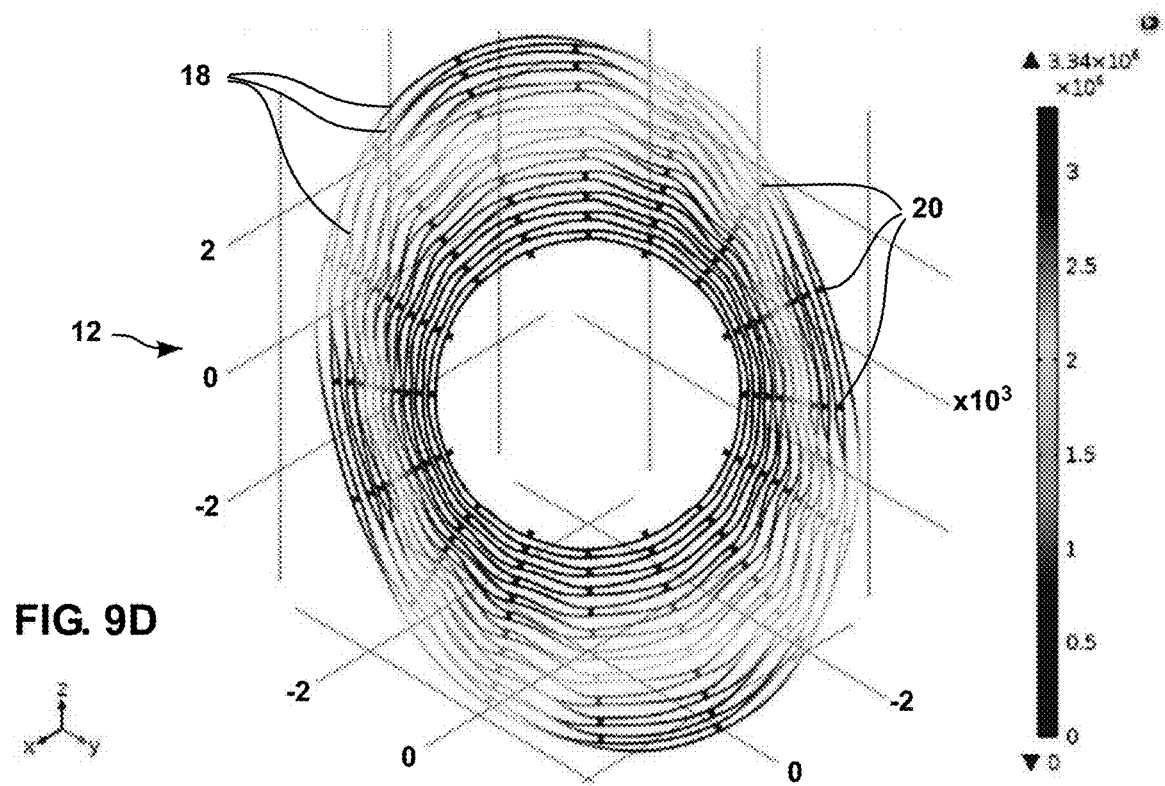
FIG. 9D illustrates a second n=2 mode of oscillation of a CVG resonator of an angular sensor according to an embodiment of this presentation.

FIG. 9D illustrates a maximum deformation of a resonator 12 as shown in FIG. 1 when the resonator oscillates in a fourth, n=2, mode of oscillation of the resonator; the mode having an axis π/8 off anti-clockwise with respect to the vertical in the figure.

The amplitude of the deformations of resonator 12 are exaggerated in the figures for clarity; the maximum amplitude of the resonator being smaller than the distance between the periphery of the resonator and the electrodes of the sensor when the resonator is at rest.

Figure 10:
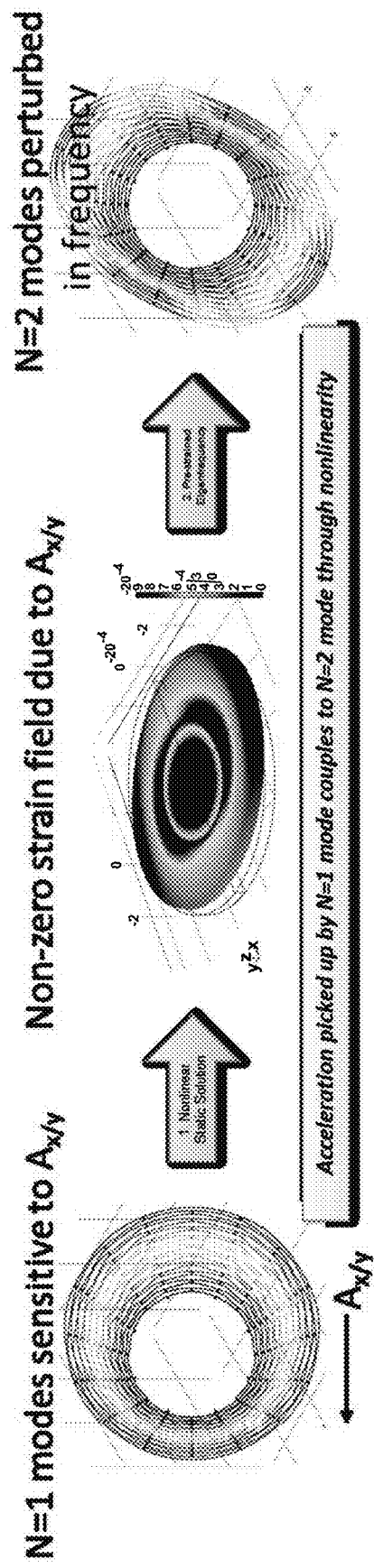
FIG. 10 illustrates how acceleration sensitivity can be introduced into n=2 vibratory modes in an angular sensor.

FIG. 10 illustrates the physical mechanism through which acceleration sensitivity would be introduced into the n=2 vibratory modes used in the high precision rotation sensor disclosed herein if the n=1 vibratory modes were not corrected by loops as illustrated for example in FIG. 4A. The n=1 modes are highly sensitive to in-plane linear accelerations (X as shown, Y by inference). Due to nonlinear effects (geometric and material), a non-zero strain field arises due to Ax acceleration or Ay acceleration. This non-zero strain then perturbs the n=2 modes in frequency, causing them to measure an artificial apparent rotation, which results in gyroscopic error. This presentation discloses applying multimode control of the type disclosed in U.S. application Ser. No. 15/253,694 to the n=1 and n=2 modes simultaneously (as opposed to the n=2 and n=3 modes control that was disclosed in U.S. application Ser. No. 15/253,694). By applying force rebalance techniques as disclosed in U.S. application Ser. No. 15/253,704 to the n=1 modes, the amount of strain that is generated by in-plane acceleration is greatly reduced, minimizing the impact on the high precision n=2 modes. At the same time, a coarse estimate of rotation rate is obtained from the n=1 mode controller and is combined with the high precision n=2 mode rotation rate readout to create a higher dynamic range rotation measurement system as was disclosed in U.S. application Ser. No. 15/253,694 (again after substitution by n=1 and n=2 mode pairs of the n=2 and n=3 mode pairs in U.S. application Ser. No. 15/253,694).

Figure 11A:
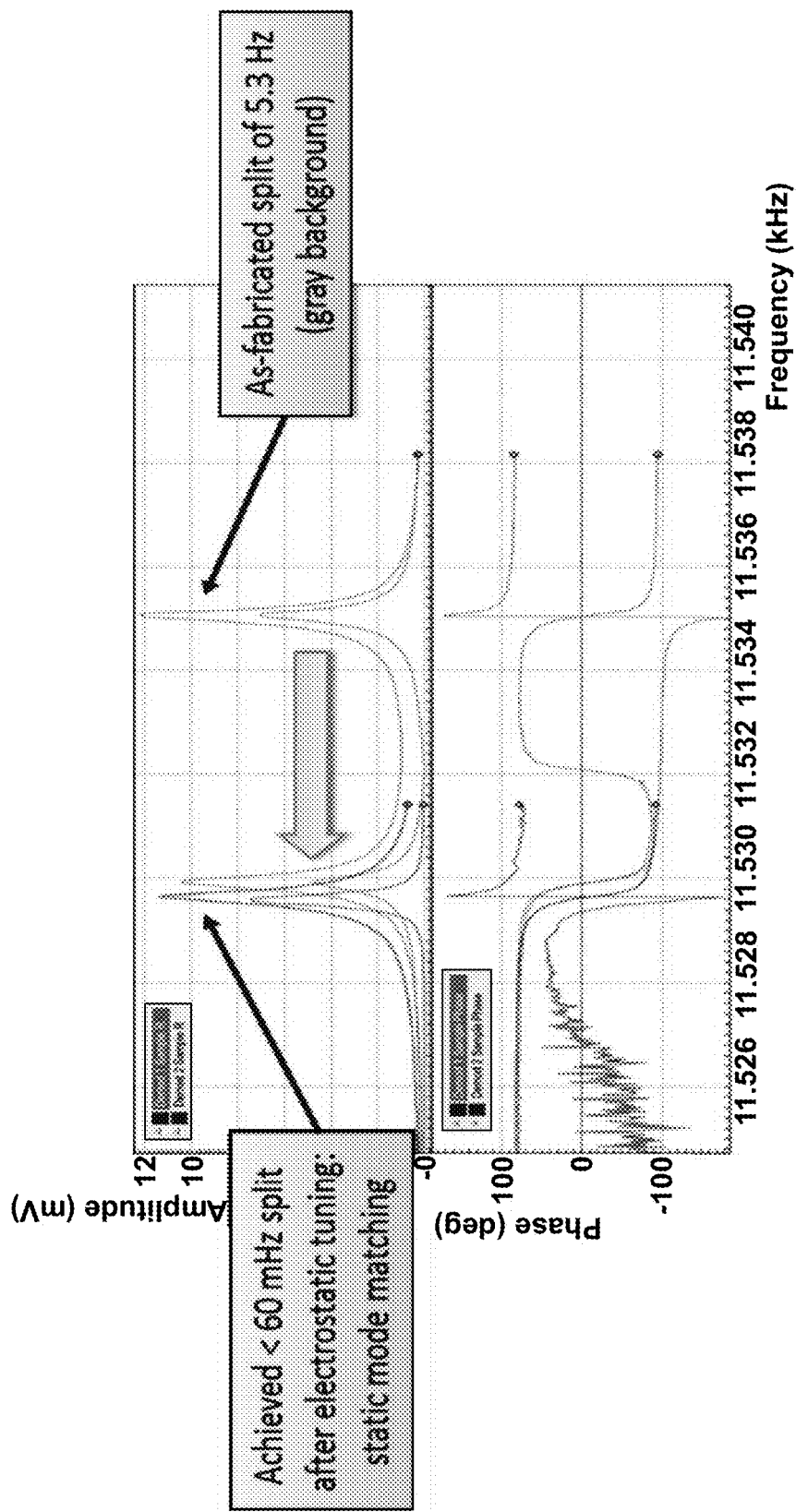
FIGS. 11A and 11B illustrate how the oscillation frequencies of the modes of a pair of modes can be controlled according to an embodiment of this presentation.
Figure 11B:
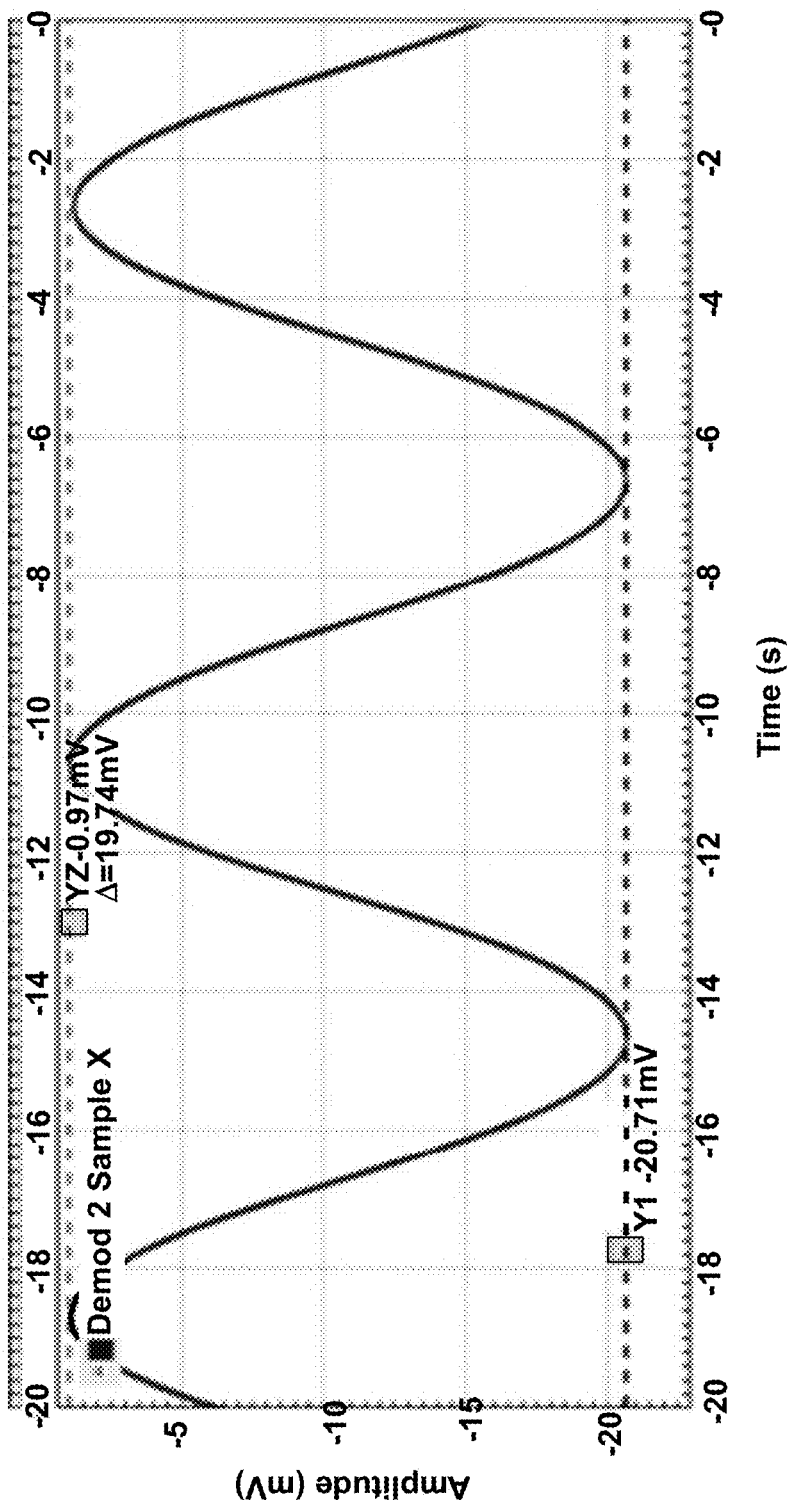

FIGS. 11A and 11B illustrate how the oscillation frequencies of the modes of a pair of modes can be controlled according to an embodiment of this presentation. The frequency of oscillation of a Si resonator 12 having 32 sub-electrodes arranged as in FIG. 7 as fabricated were measured for its two n=2 modes without operating the resonator using control loops as illustrated in FIG. 4. The measurement reproduced in FIG. 11A shows a 5.3 Hz frequency split between the two n=2 modes. The frequency of oscillation of the same resonator were then measured for its two n=2 modes after applying the appropriate combination of static DC tuning potentials to electrodes BT1, BT2, BX1, and BX2 as detailed above, showing an optimally tuned resonator split smaller than 60 mHz between the two n=2 modes. FIG. 11B illustrates the output voltage signal from the angular sensor when it is operated using the control loops as illustrated in FIG. 4. In this case, a known sinusoidal physical rotation with a period of 8 seconds was applied to the angular sensor using a precision rate table and the resulting output voltage proportional to the rotation rate was measured.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art.

No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art.

The invention claimed is:

1. An angular sensor, comprising:
a Coriolis vibratory gyroscope (CVG) resonator, provided for oscillating along:
a first pair of normal n-=modes comprising a first normal mode and a second normal mode; each of the first and second normal modes having one anti-nodal axis; and
a second pair of normal n=2 modes comprising a third normal mode and a fourth normal mode; each of the third and fourth normal modes having two anti-nodal axis;
at least one of a drive electrode and a sense electrode aligned along the anti-nodal axis of each of the first and second normal modes;
at least one of a drive electrode and a sense electrode aligned along a first anti-nodal axis of each of the third and fourth normal modes mode; and
a pair of bias tune electrodes aligned with a second anti-nodal axis of each of the third and fourth modes if no drive or sense electrode is aligned with said second anti-nodal axis.

2. The angular sensor of claim 1, wherein said at least one of a drive electrode and a sense electrode aligned along the first and second anti nodal axis are each part of a pair comprising one sense electrode and one drive electrode.

3. The angular sensor of claim 2, comprising:
a coarse readout circuit configured for:
driving the first pair of modes,
measuring motion of the first pair of modes with a first sensitivity, and
deriving from the measured motion of the first pair of modes a coarse measurement of a true angular rate of the CVG resonator; and
a fine readout circuit configured for:
receiving the coarse measurement,
driving the second pair of modes,
measuring motion of the second pair of modes with a second sensitivity higher than the first sensitivity; said measuring being offset by said coarse measurement and
deriving, from the measured motion of the second pair of modes and the received coarse measurement, a fine measurement of the true angular rate of the CVG resonator.

4. The angular sensor of claim 3, wherein the coarse readout circuit comprises, for said driving the first pair of modes:
a first frequency reference configured to generate a first reference signal; and
a first phase control circuit configured to:
measure a first phase difference between a first phase target, and the difference between: a phase of an oscillation of the first normal mode and a phase of the first reference signal;
apply a first phase correction signal to the CVG resonator, to reduce the first phase difference; and
a second phase control circuit configured to:
measure a second phase difference between a second phase target, and the difference between: a phase of an oscillation of the second normal mode and the phase of the first reference signal; and
apply a second phase correction signal to the CVG resonator, to reduce the second phase difference.

5. The angular sensor of claim 4, wherein the fine readout circuit comprises, for said driving the second pair of modes:
a second frequency reference configured to generate a second reference signal;
a third phase control circuit configured to:
measure a third phase difference between a third phase target, and the difference between: a phase of an oscillation of the third normal mode and a phase of the second reference signal; and
apply a third phase correction signal to the CVG resonator, to reduce the third phase difference; and
a fourth phase control circuit configured to:
measure a fourth phase difference between a fourth phase target, and the difference between: a phase of an oscillation of the fourth normal mode and the phase of the second reference signal; and apply a fourth phase correction signal to the CVG resonator, to reduce the fourth phase difference.

6. The angular sensor of claim 4, wherein the frequency reference comprises an atomic frequency reference; or an ovenized crystal oscillator (OCXO) or a temperature controlled crystal oscillator (TCXO).

7. The angular sensor of claim 6, wherein the atomic frequency reference is a rubidium, cesium, or hydrogen or strontium based dock.

8. The angular sensor of claim 6, wherein the atomic frequency reference is a chip-scale atomic clock (CSAC).

9. The angular sensor of claim 4, wherein the first phase control circuit is configured to apply a first phase correction signal to the CVG resonator by adjusting a natural frequency of the first normal mode.

10. The angular sensor of claim 4, wherein the first phase control circuit is configured to adjust the natural frequency of the first normal mode by applying a bias voltage to a first tuning electrode of the CVG resonator.

11. The angular sensor of claim 4, wherein the second phase control circuit is configured to adjust a natural frequency of the second normal mode by applying a bias voltage to a second tuning electrode of the CVG resonator.

12. The angular sensor of claim 3, wherein the fine readout circuit is configured to drive the third normal mode at a first drive frequency and to drive fourth normal mode at a second drive frequency, and
wherein the fine readout circuit is configured to derive the fine measurement of the true angular rate of the CVG resonator by adjusting the first drive frequency and the second drive frequency so that the difference between the first drive frequency and the second drive frequency is proportional to the coarse measurement.

13. The angular sensor of claim 3, wherein the fine readout circuit is configured to derive the fine measurement of the true angular rate of the CVG resonator by adjusting a natural frequency of the third normal mode and a natural frequency of fourth normal mode so that the difference between the natural frequency of the third normal mode and the natural frequency of the fourth normal mode is proportional to the coarse measurement.

14. The angular sensor of claim 13, wherein the fine readout circuit is configured to adjust the natural frequency of the third normal mode by adjusting a bias voltage applied to a tuning electrode coupled to the third normal mode.

15. The angular sensor of claim 3, wherein the fine readout circuit is configured to generate a measurement of the difference between the true angular rate of the CVG resonator and the coarse measurement with a resolution of 19 bits.

16. The angular sensor of claim 3, wherein the coarse readout circuit is configured to generate a measurement of the difference between the true angular rate of the CVG resonator and the coarse measurement with a resolution of 19 bits.

17. The angular sensor of claim 16 wherein the fine readout circuit is configured to generate a measurement of the difference between the true angular rate of the CVG resonator and the coarse measurement with a resolution of 19 bits.

18. The angular sensor of claim 3, wherein the coarse readout circuit is configured to drive the first pair of modes so that an amplitude of motion of first normal mode is about 10 times an amplitude of motion of the second normal mode.

19. The angular sensor of claim 3, wherein the coarse readout circuit is configured to drive the first pair of modes so that a phase of motion of first normal mode is about 90 degrees different from a phase of motion of the second normal mode.

20. The angular sensor of claim 3, wherein the fine readout circuit is configured to drive the first pair of modes so that an amplitude of motion of the third normal mode is about 10 times an amplitude of motion of the fourth normal mode.

21. The angular sensor of claim 3, wherein the fine readout circuit is configured to drive the first pair of modes so that a phase of motion of the third normal mode is about 90 degrees different from a phase of motion of the fourth normal mode.

22. The angular sensor of claim 3, wherein the fine readout circuit is configured to drive the third normal mode at a first drive frequency and to drive the fourth normal mode at a second drive frequency, and
wherein the fine readout circuit is configured to derive a measurement of the difference between the true angular rate of the CVG resonator and the coarse measurement by adjusting the first drive frequency and the second drive frequency so that the difference between the first drive frequency and the second drive frequency is proportional to the coarse measurement.

23. The angular sensor of claim 3, wherein the fine readout circuit is configured to derive a measurement of the difference between the true angular rate of the CVG resonator and the coarse measurement by adjusting a natural frequency of the third normal mode and a natural frequency of the fourth normal mode so that the difference between the natural frequency of the third normal mode and the natural frequency of the fourth normal mode is proportional to the coarse measurement.

24. The angular sensor of claim 3, wherein the fine readout circuit is configured to adjust the natural frequency of the third normal mode by adjusting a bias voltage applied to a tuning electrode coupled to the third normal mode.

25. The angular sensor of claim 1, further comprising:
a first pair of bias quadrature electrodes aligned with an axis 360/(8*n) degrees off the axis of the at least one of a sense and a drive electrodes of each mode if no drive or sense electrode or no bias tune electrode pair is aligned with said 360/(8*n) degrees off axis; and
a second pair of bias quadrature electrodes aligned with an axis 360/(8*n) degrees off the axis of the bias tune electrodes of each mode if no drive or sense electrode or no bias tune electrode pair is aligned with said 360/(8*n) degrees off axis.

26. The angular sensor of claim 1, wherein said resonator has a N-fold rotational symmetry, N being a power of 2 and being at least equal to 8.

27. The angular sensor of claim 1, wherein each electrode comprises a sub-electrode set having at least a pair of differential sub-electrodes.

28. The angular sensor of claim 27, comprising at least 32 sub-electrodes.

29. The angular sensor of claim 27, wherein each electrode comprises a sub-electrode set having at least two pairs of interdigitated differential sub-electrodes.

30. The angular sensor of claim 27, wherein the two sub-electrodes of each sub-electrodes pair are arranged for receiving or for emitting differential signals 180 degrees out of phase with respect to each other.

* * * * *